United States Patent [19]

Inouchi et al.

[11] Patent Number: 5,043,883

[45] Date of Patent: Aug. 27, 1991

[54] PIPE-LINED DATA PROCESSOR SYSTEM OF SYNCHRONOUS TYPE HAVING MEMORY DEVICES WITH BUFFER MEMORY AND INPUT/OUTPUT DATA CONTROL

[75] Inventors: Hidenori Inouchi, Fuchu; Haruo Yoda, Nishitama; Hiroshi Ouchi, Higashiyamato; Hiroshi Sakou, Shiki, all of Japan

[73] Assignee: Hitachi, Ltd., Tokyo, Japan

[21] Appl. No.: 285,752

[22] Filed: Dec. 16, 1988

[30] Foreign Application Priority Data

Dec. 17, 1987 [JP] Japan ................................ 62-320852
Dec. 25, 1987 [JP] Japan ................................ 62-327148

[51] Int. Cl.⁵ ...................... G06F 9/38; G06F 15/16; G06F 5/06
[52] U.S. Cl. .................................. 364/200; 364/231.8; 364/239; 364/239.6; 364/238.6; 364/228.3; 364/238.4; 364/271; 364/271.2
[58] Field of Search ... 364/200 MS File, 900 MS File

[56] References Cited

U.S. PATENT DOCUMENTS

| | | | |
|---|---|---|---|
| 4,309,691 | 1/1982 | Castleman | 364/200 |
| 4,344,132 | 8/1982 | Dixon et al. | 364/200 |
| 4,395,698 | 7/1983 | Sternberg et al. | 382/27 |
| 4,395,700 | 7/1983 | McCubbey et al. | 382/27 |
| 4,398,176 | 8/1983 | Dargel et al. | 382/27 |
| 4,785,415 | 11/1988 | Karlquist | 364/900 |
| 4,876,644 | 10/1989 | Nuechterlein et al. | 364/200 |

*Primary Examiner*—Gareth D. Shaw
*Assistant Examiner*—Kevin A. Kriess
*Attorney, Agent, or Firm*—Antonelli, Terry, Stout & Kraus

[57] ABSTRACT

A pipe-lined data processor system comprising a plurality of processors interconnected in the form of a pipe line, a plurality of memory apparatus connected to each of the processors through output data buses for supplying data to the processors or storing data from the processors, and a control board connected to the memory apparatus through input data buses for managing the operation sequences of the processors and the memory apparatus, wherein the plurality of memory apparatus comprise each a main memory for storing the data to be processed as predetermined by the processors or the data having been processed as predetermined by the processors, a buffer memory for temporarily storing the data, first control means for controlling the timing of input/output of the data between the main memory and the buffer memory, and second control means for controlling the timing of input/output of the data between the buffer memory and the input/output buses.

16 Claims, 17 Drawing Sheets

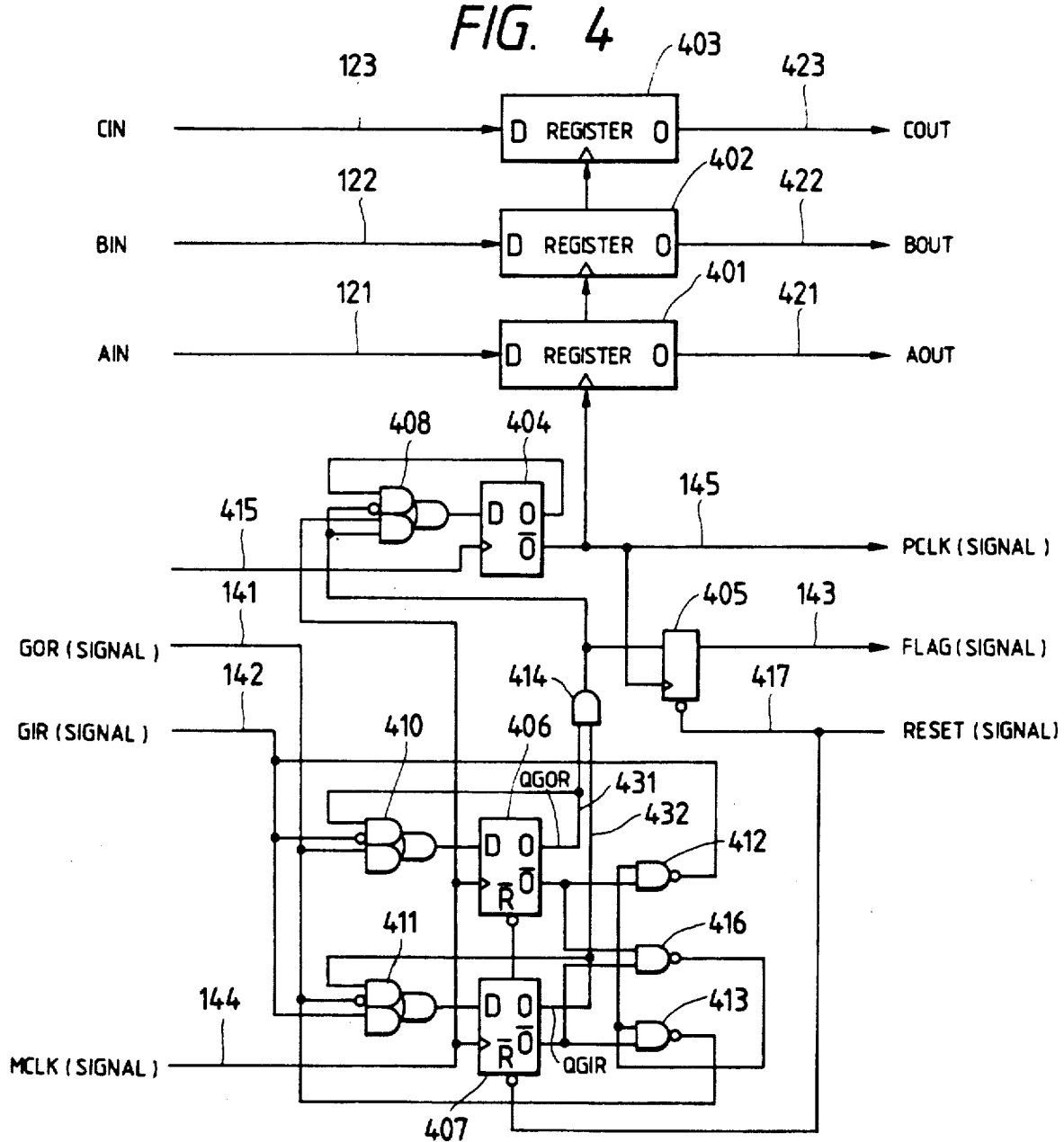

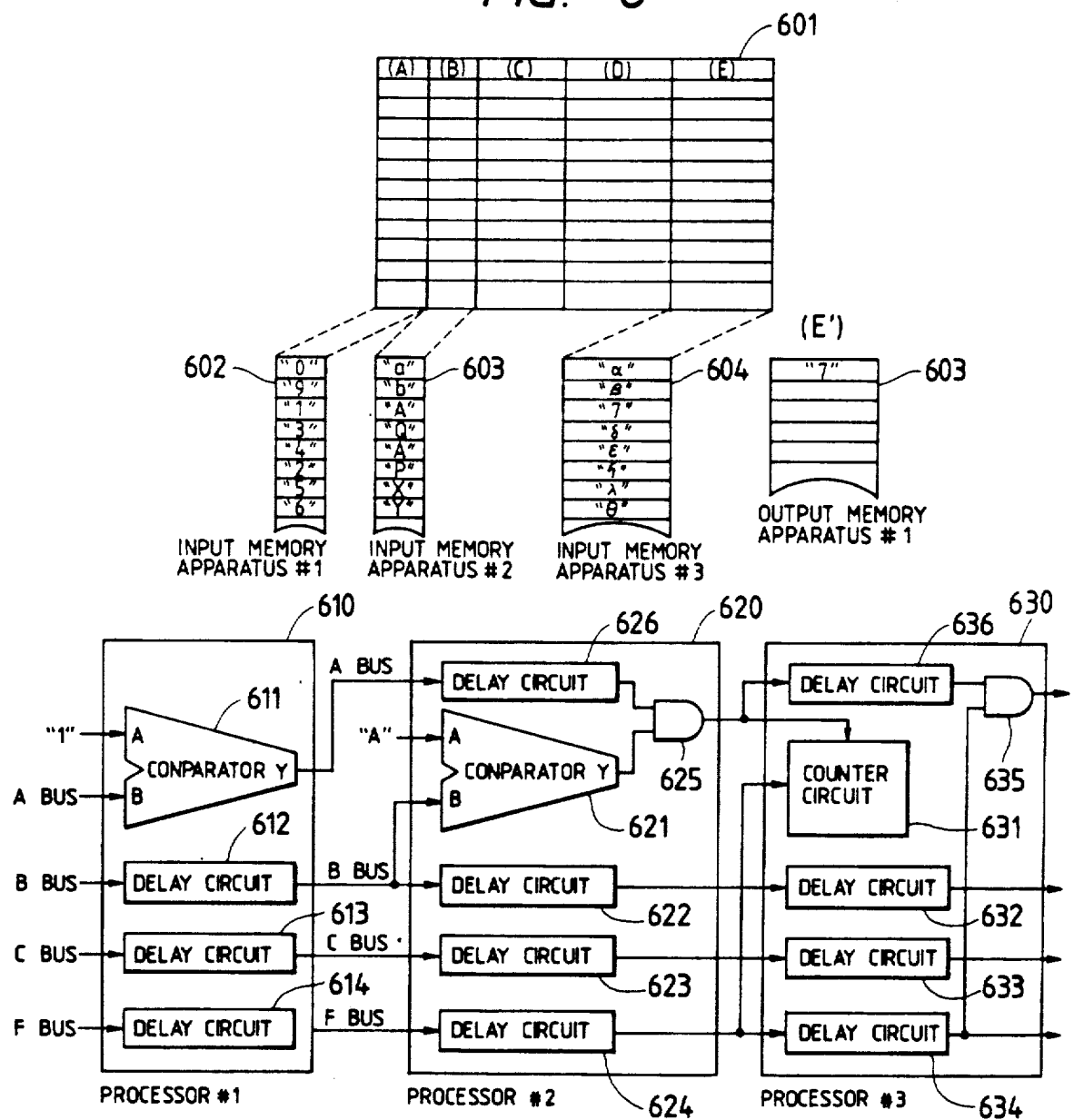

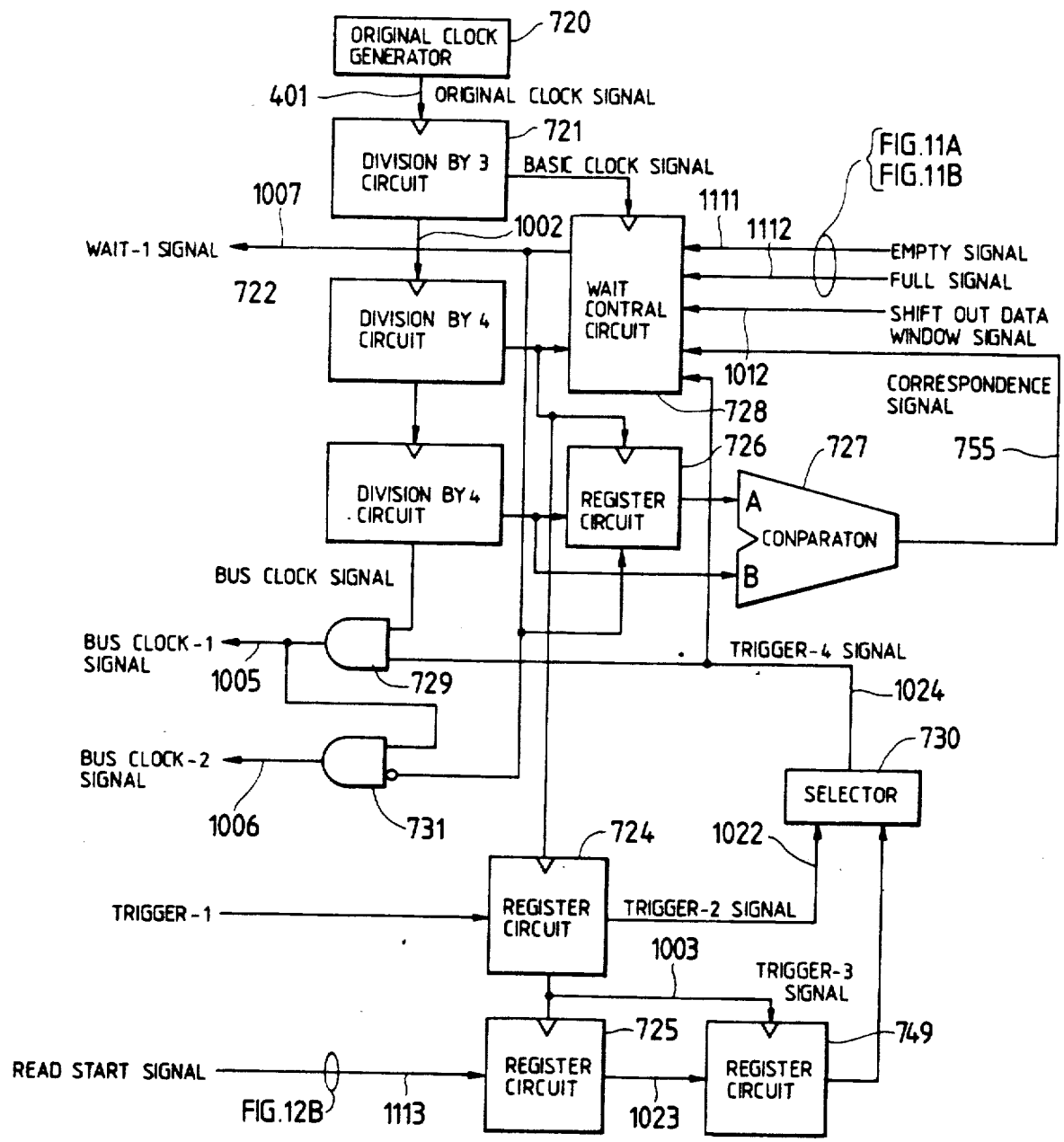

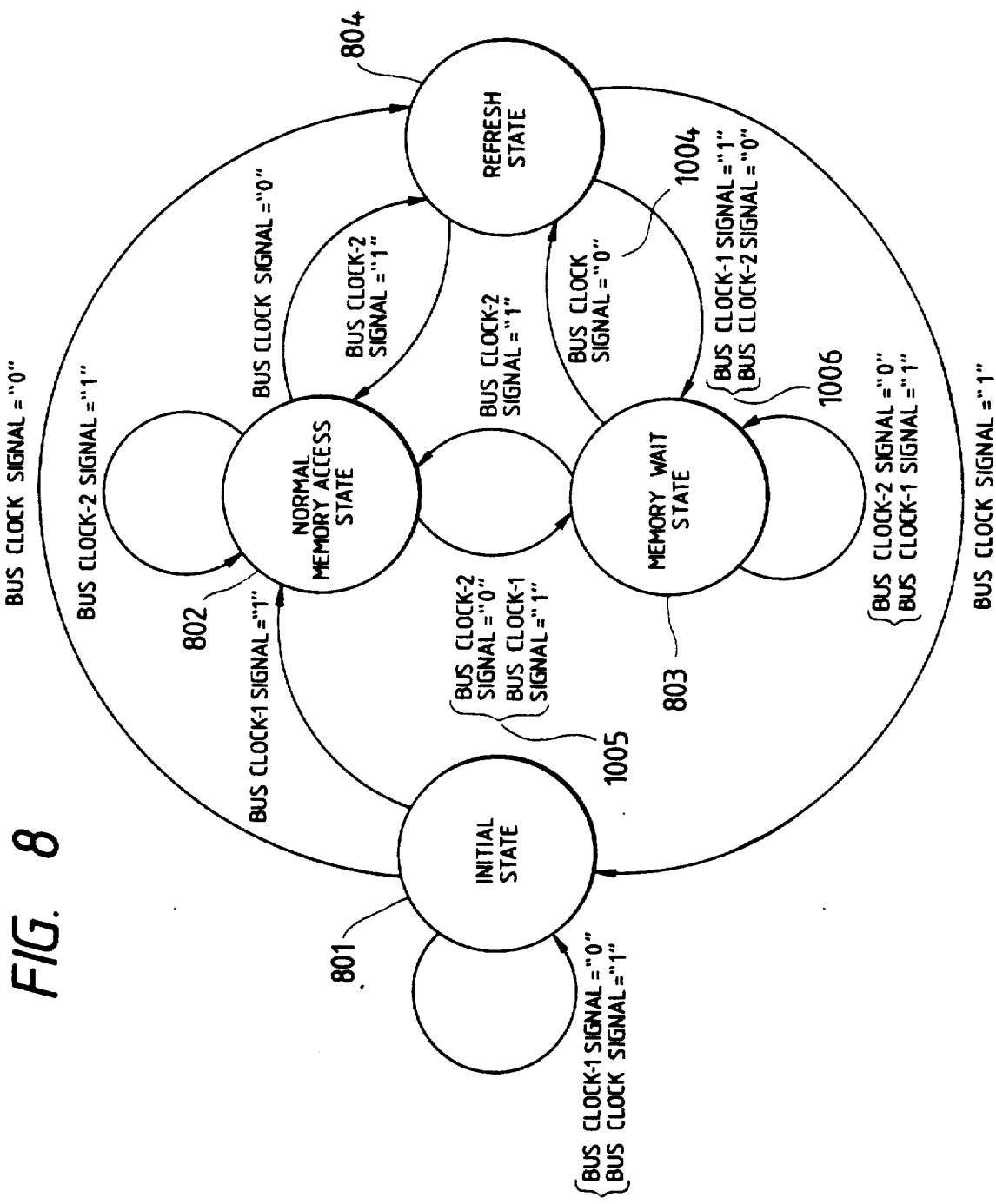

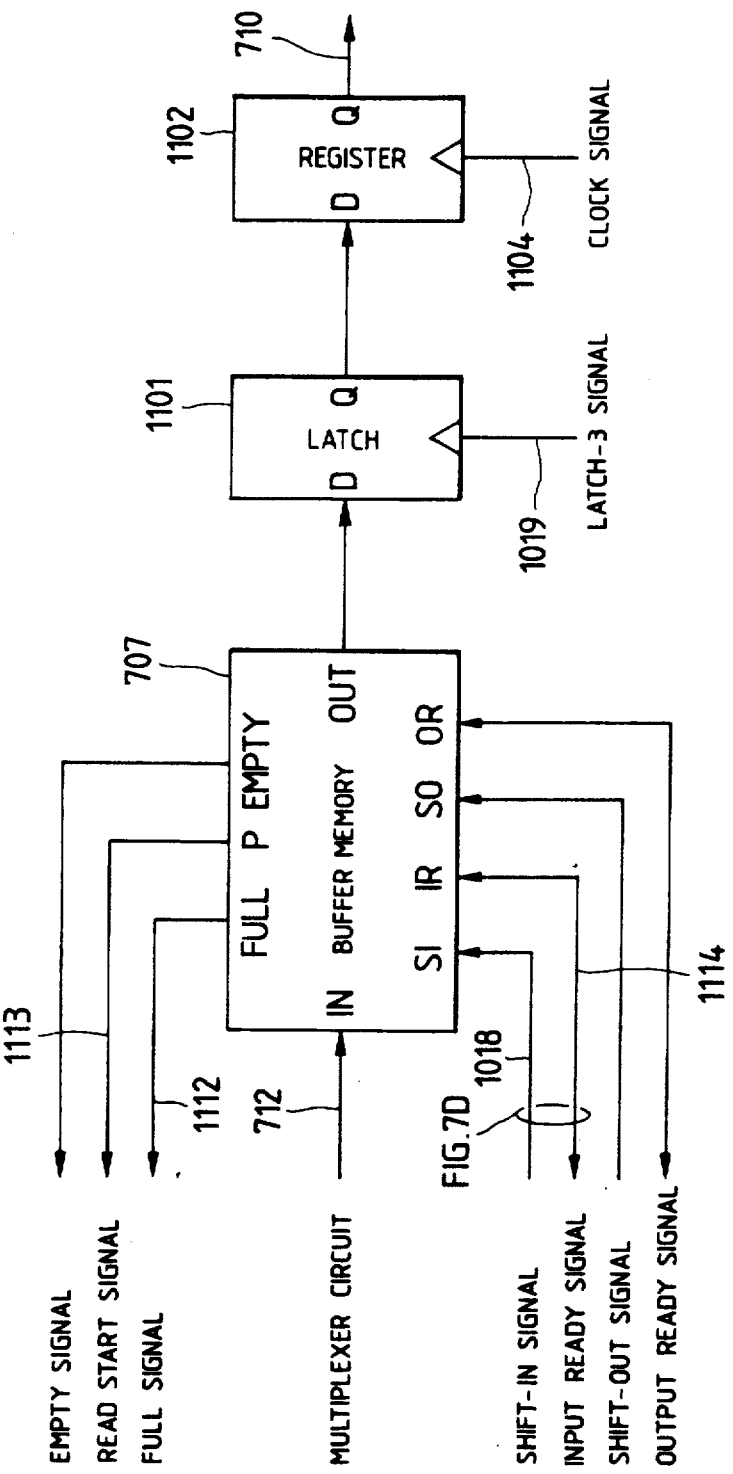

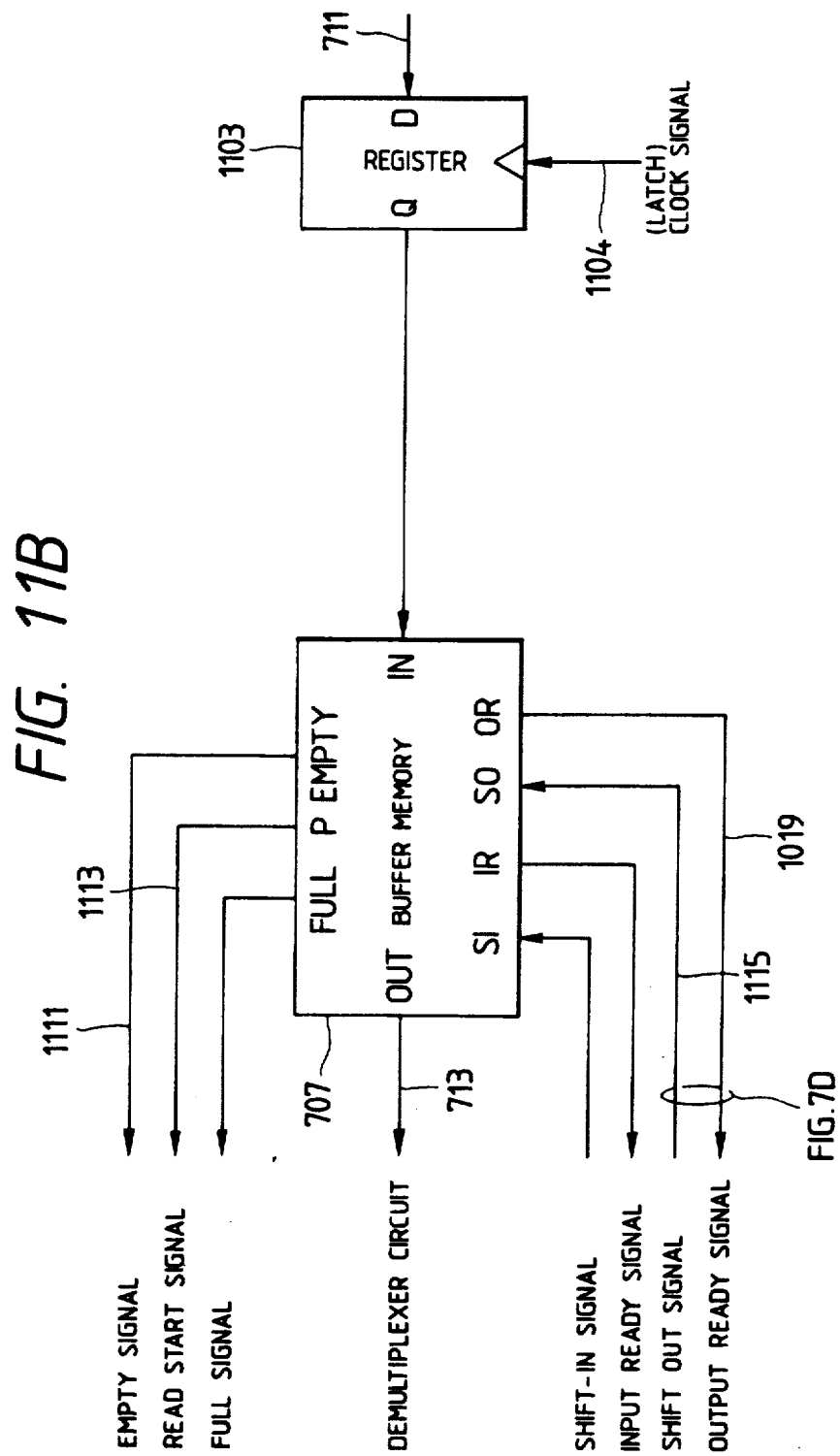

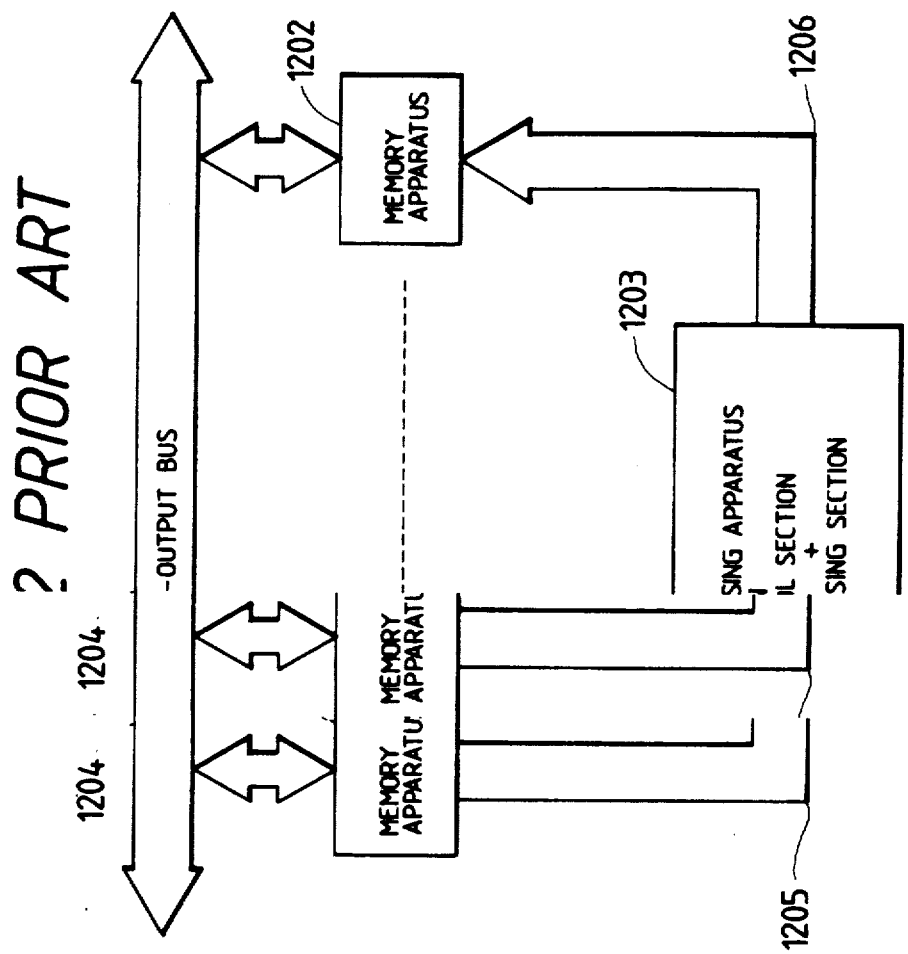

PIPE-LINED DATA PROCESSOR SYSTEM OF SYNCHRONOUS TYPE HAVING MEMORY DEVICES WITH BUFFER MEMORY AND INPUT/OUTPUT DATA CONTROL

BACKGROUND OF THE INVENTION

The present invention relates to a pipe-lined data processor system for processing, in a data-drive manner, data which are stored in separate memory apparatus and have the sequence previously determined to be processed.

A conventional pipe-lined data processor system, as shown in FIG. 12, comprises memory apparatus 1201, 1202 and a processing apparatus section 1203. In operation of this system, data addresses for the memory apparatus are managed concentratedly by a control section, which belongs to the processing apparatus section 1203, in accordance with the centralized processing form of Neumann type. Therefore, a problem arises in that as the amount of data to be concurrently processed in parallel is increased, the address management mechanism becomes larger in size and hence practical packaging is rendered more difficult. One of means for solving the above problem is disclosed in Japanese Patent Laid-Open No. 61-201338 (1986) and No. 61-202227 (1986), for example. With the disclosed means, address management for the memory apparatus is carried out by placing a data string on a bus, which includes a command called an address token, and then sending the data string to the memory apparatus. Also, to achieve synchronous processing of plural data, a queue mechanism is provided in a processing section to temporarily store the data therein.

The prior system as shown in FIG. 12 has another problem. More specifically, in case that the data speed on an input/output bus 1204 for a peripheral apparatus is different from the processing speed of input/output buses 1205, 1206 for the pipe-line processing section, one memory apparatus cannot concurrently be used for two purposes; i.e., for input/output processing and for pipe-line processing. Further, the system disclosed in the above Laid-Open publications can avoid difficulty in practical packaging when it is needed to process a plurality of operand data at the same time. However, control is complicated because the memory apparatus is required to distinguish an address token and a data token from each other, and the proportion of a period in which effective data is carried on the bus (i.e., bus utilization factor) is not improved.

SUMMARY OF THE INVENTION

It is an object of the present invention to solve the foregoing problem, and provide a high-efficient, pipe-lined data processor system.

Another object of the present invention is to provide a memory apparatus suitable for processing data in a pipe-line manner with a high degree of efficiency.

To achieve the above objects, the present invention resides in a pipe-lined data processor system comprising a plurality of processors interconnected in the form of a pipe line, a plurality of memory apparatus connected to each of the processors through output data buses for supplying data to the processors or storing data from the processors, and a control board connected to the memory apparatus through input data buses for managing the operation sequences of the processors and the memory apparatus, wherein:

the plurality of memory apparatus each comprise a main memory for storing the data to be processed as predetermined by the processors or the data having been processed as predetermined by the processors, a buffer memory for temporarily storing the data, first control means for controlling the timing of input/output of the data between the main memory and the buffer memory, and second control means for controlling the timing of input/output of the data between the buffer memory and the input/output buses;

the control board inputs first and second signals indicating the storage status of the buffer memory (the state where the buffer memory is ready to output data and the state where it is ready to input data) and issued from the second control means of each memory apparatus, and outputs signals for controlling the timing at which the data output from each memory apparatus to be processed by the processors are supplied to the processors, or the timing at which the data having been processed by and output from the processors are written into the succeeding processors or the designated one or more of the memory apparatus; and each of the processors executes predetermined data processing in accordance with the timing signals output from the control board, and outputs the processed result to the succeeding processor, or a timing signal to the designated one or more of the memory apparatus for writing the processed result into that or those memory apparatus.

More detailed features of the present invention are as follows.

The present invention adopts a technique to allocate and store a plurality of operand data to and in different memory apparatus, and automatically produce addresses previously determined in the memory apparatus. With such a technique, since a host computer does not manage those addresses in the memory apparatus, it is impossible to concurrently read out the plural operand data and perform proper data processing in accordance with operation clocks of a processor. Therefore, the memory apparatus comprise one group of plural input memory apparatus for supplying the data to be processed to the processor and the other group of plural output memory apparatus for storing the result of processed data delivered from the processor, and a buffer memory is disposed in each of the memory apparatus to absorb an offset in the operation timing among the memory apparatus. Then, two (first and second) signals indicating storage states (full and empty) dependent on the number of data stored in the buffer memory are respectively synchronized with a first operation clock signal (MCLK) which governs the basic timing of the data processing system, and thereafter those first and second signals from the buffer memories are respectively connected in wired OR fashion for being output as separate common signal lines. Because the timing at which data pass the buffer memory is indefinite, a control board monitors the above two storage states so that the processor may detect the data read out of the memory apparatus and to be processed thereby. When those signals indicating the two storage states are input, the control board generates a flag signal indicating the timing at which the data to be processed are supplied to the processor. On the other hand, the processor carries out data processing in accordance with the flag signal, and then delays the flag signal input from the proceeding processor by a period of processing time through a delay circuit, for example, to keep output of both the processed data and the flag signal synchronized, followed by outputting the processed data and the delayed flag signal to the succeeding processor. Further, the or those output memory apparatus designated for writing of the processed data are each designed to write the processed data into its internal buffer memory in accordance with the flag signal output from the processor.

If the number of data stored in the buffer memory of any one input memory apparatus has become below a certain lower limit (i.e., empty state) for some cause, all the operand data necessary for processing in the processor cannot be prepared together. In this case, therefore, that one memory apparatus controls to turn off the first state output signal (GOR), while the control board stops a second operation clock (PCLK) to be applied to the processor and simultaneously forcibly turn off the second state output signal (GIR) upon detecting turn-off of the first state output signal (GOR). The output memory apparatus are each designed not to take any data into the internal buffer memory when the second state output signal (GIR) is turned off. This enables to prevent the same processed data from being erroneously written into the output memory apparatus side. Further, if writing into a main memory cannot catch up with reading from the buffer memory in any one output memory apparatus, the number of data stored in the buffer memory approaches its total capacity (i.e., full state). Therefore, as with the case of an empty state of the data number, that one output memory apparatus controls to turn off the second state output signal (GIR), while the control board forcibly turns off the first state output signal (GOR) and stops the second operation clock signal (PCLK) to be applied to the processor upon detecting turn-off of the second state output signal (GIR). In addition, the memory apparatus are each designed not to read any data from the buffer memory when the first state output signal (GOR) is turned off. As a result, it becomes possible to inhibit the redundant data from being read out of the buffer memory, even when the processor is caused to stop its operation because writing into the main memory cannot catch up with reading from the buffer memory.

BRIEF DESCRIPTION OF THE DRAWINGS

FIG. 4 is a diagram showing the configuration of a sequential controller in a control board shown in FIG. 1;

FIG. 6 is a diagram showing the configuration of the pipe-lined processor system when it is used to carry out simple retrieval process;

FIGS. 7B, 7C and 7D are block diagrams of different parts of a timing signal generator circuit in FIG. 7A, showing a basic timing signal generator section for the sequential controller, a control signal generation timing circuit for a main memory chip module and a logic circuit, and a data input/output control signal generator circuit for a buffer memory, respectively;

FIG. 8 is a state transition diagram of the sequential controller in the memory board;

FIGS. 11A and 11B are block diagrams of peripheral circuits of the buffer memory in FIG. 7A; and FIG. 12 is a prior art pipe-lined data processor system.

DESCRIPTION OF THE PREFERRED EMBODIMENTS

Figure 1:
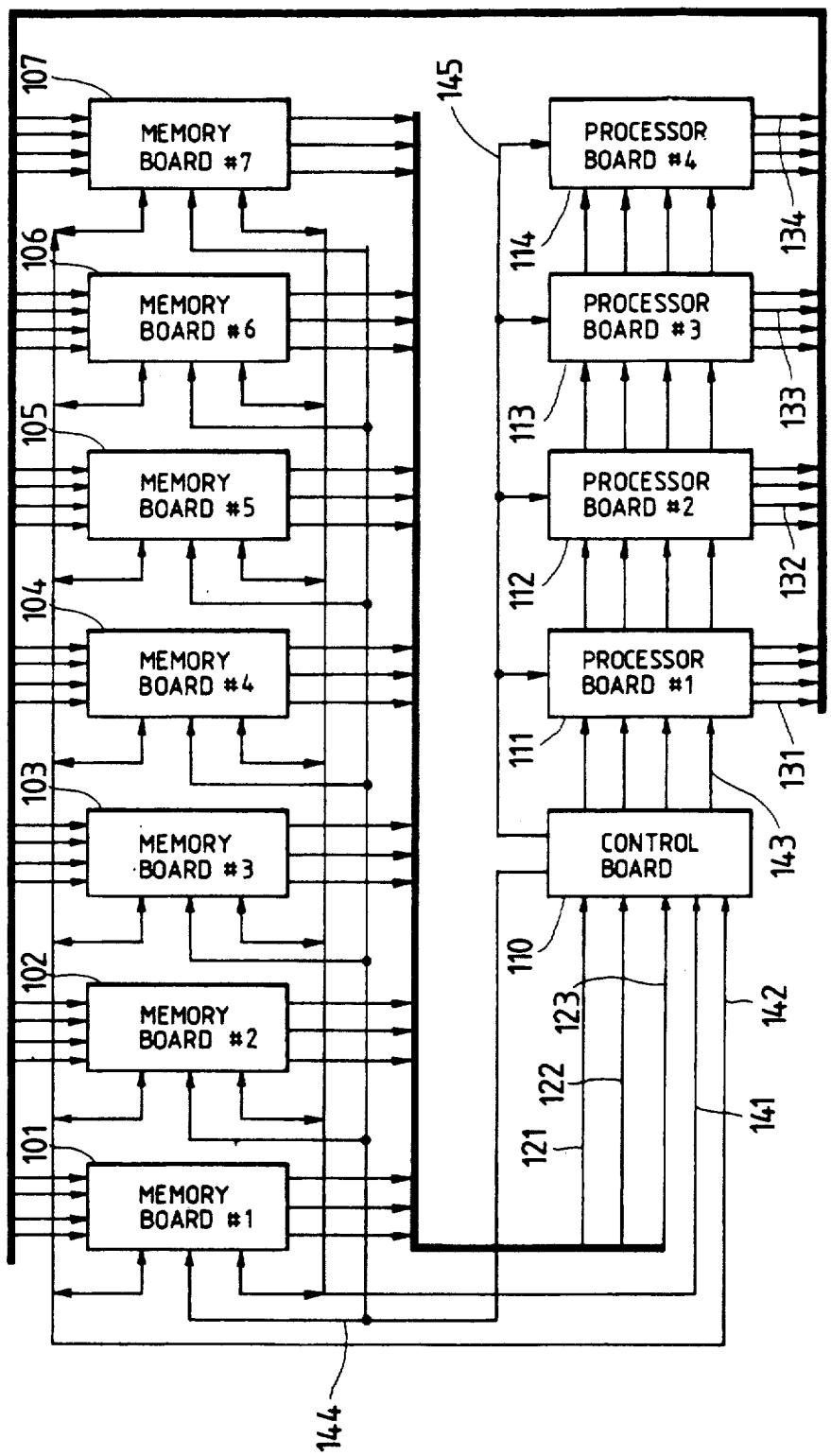
FIG. 1 is a general configuration diagram of a pipe-lined data processing system, showing one embodiment of the present invention.

A first embodiment of the present invention will hereinafter be described in detail by referring to the drawings.

FIG. 1 shows a block diagram of a data processing system comprising seven memory boards, four processor boards interconnected in pipe-line fashion, and a control board for controlling pipe-line operation.

Designated at 101-103 are a group of input memory boards for storing data and supplying the data to the pipe-lined processors.

104-107 are a group of output memory boards for receiving data from the pipe-lined processors and storing the data.

110 is a control board for managing the operation sequence with which the pipe-lined processors carry out data processing properly.

111-114 are processors interconnected in a pipe-line fashion. Each of the input memory boards and the control board are connected through three external input data buses 121-123, while the output memory boards and the pipe-lined processor boards are each connected through four output buses 131-134. The control board 110 produces a flag signal 143 at the proper timing in synchronous relation with effective data on the external input data buses 121-123, which data is read out of the group of input memory boards in synchronous relation therewith, adds the flag signal to the data for being set into the data form of a "token", and sends it to one of the pipe-lined processor boards in the next stage. Each of the pipe-lined processor boards receives, as input thereto, both the data and the flag signal output from the preceding processor or the control board, performs both predetermined data processing and delay processing of the flag signal, and transfers the processed data and the delayed flag signal to the plurality of output memory boards, as appropriate, through the four output buses 131-134 as "external output token buses". Each of the output memory boards selects the preset output bus, and receives the processed data by referring to the flag signal. Hereinafter, the buses for connecting the output buses, which carries the delayed flag signal and the processed data, and the memory output boards will be referred to as external output token buses.

141 is a GOR (Group Output Ready) signal and indicates that all the input memory boards are ready to output data, when it takes a value "1".

142 is a GIR (Group Input Ready) signal and indicates that all the output memory boards are ready to input data, when it takes a value "1".

144 is an operation clock signal MCLK (Memory Clock) supplied to all the memory boards from the control board 110.

145 is an operation clock signal PCLK (Processor Clock) supplied to all the pipe-lined processor boards from the control board 110.

The MCLK signal has the same cycle and phase as those of the PCLK signal, but is different from the PCLK signal in that the former is constantly generated upon start of the reading process for the input memory boards, while the latter is generated only during the time pipe-line processing is effective.

The embodiment shown in FIG. 1 can perform data processing in a pipe-line manner such that it concurrently reads a maximum of three operand data from the input memory boards (i.e., devices constituting main memories whose internal operation frequencies may be different from each other) for being processed by the pipe-lined processor boards, and asynchronously writes the data output from a maximum of four processor boards into the plurality of output memory boards (i.e., devices constituting main memories whose internal operation frequencies may be different from each other).

Figure 2:
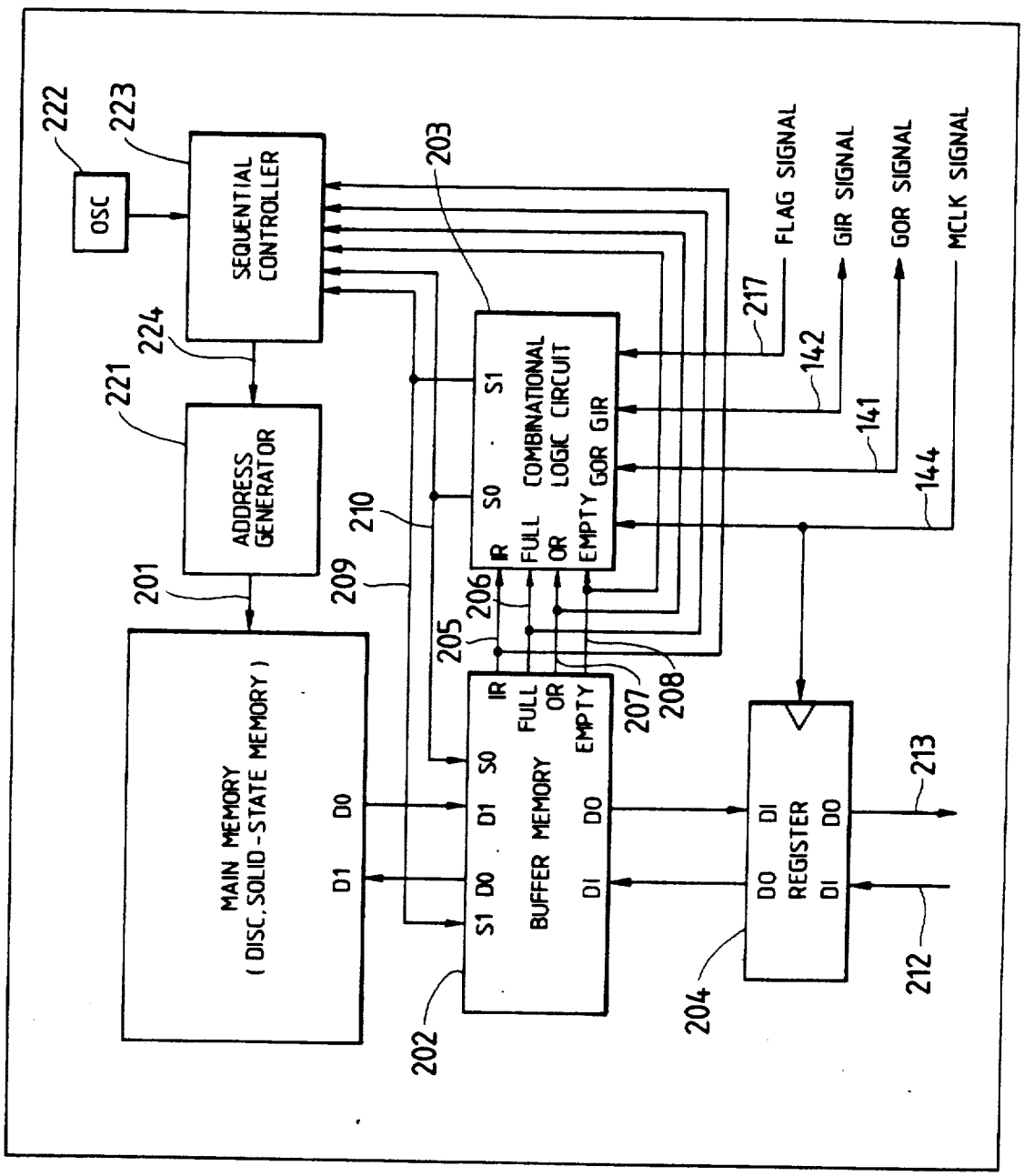
FIG. 2 is a block diagram showing the configuration of the interior of a memory board shown in FIG. 1.

FIG. 2 is a block diagram showing the interior of each memory board shown in FIG. 1.

Designated at 201 is a main memory constituted by a magnetic disc memory or a semiconductor memory, for example.

202 is a buffer memory. As the buffer memory, an FIFO memory '67413' manufactured by MMI Co., Ltd. can be used, for example. Between the buffer memory 202 and an external data bus 212, there is disposed a register 204 for adjusting the timed relationship between internal operation of the memory board and external bus operation. An external data bus 213 represents any one among the external data buses 121-123 shown in FIG. 1.

203 is a combinational logic circuit for controlling input/output operation of data between the buffer memory 202 and the external data buses. The data on the external output data bus 212 is first latched in the register 204 upon rising of the MCLK signal 144 and then is written into the buffer memory 202 in response to a shift-in signal 209. The external data bus 212 represents any one among the output buses 131-134 shown in FIG. 1. On the contrary, the data written into the buffer memory 202 from the main memory is read out in response to a shift-out signal 210 and is issued to the external input data bus 213 after being adjusted in timing through the register 204. The buffer memory 202 has four types of signals indicated below as means for outputting its internal status.

205 is an IR (Input Ready) signal and indicates that an input stage of the buffer memory 202 still has room to input data, when it takes a value "1".

206 is a FULL signal and indicates that the amount of data being input in the buffer memory 202 exceeds a certain upper limit, when it takes a value "1".

207 is an OR (Output Ready) signal and indicates that effective data is present in an output stage of the buffer memory 202, when it takes a value "1".

208 is an EMPTY signal and indicates that the amount of data being input in the buffer memory 202 is below a certain lower limit, when it takes a value "1".

The data transfer between the main memory 201 and the buffer memory 202 is controlled by a sequential controller 223. In case of reading, the sequential controller 223 in the input memory board reads out the contents of the main memory 201 on a block by block basis and writes each block into the buffer memory 202. Whether a next block is read out or not is decided by the sequential controller 223 dependent on the number of data blocks being input in the buffer memory 202. Stated otherwise, if the number of data blocks being input in the buffer memory 202 exceeds a certain upper limit, the FULL signal 206 is set to a value "1" and the sequential 223 in the memory board controls to inhibit read out of the next block. In case of writing, the sequential controller 223 in the output memory board reads out the contents of the buffer memory 202 on a block by block basis and writes each block into the main memory 201. Whether a next block is written or not is decided by the sequential controller 223 dependent on the number of data blocks being input in the buffer memory 202 similar to the above reading case. If the number of data blocks being input in the buffer memory 202 is below a certain lower limit, the EMPTY signal 208 is set to a value "1" and the sequential controller 223 in the memory board controls to inhibit wiring of the next block. 221 is an address generator which updates an address in response to an address clock signal 224 output from the sequential controller 223 and also supplies an address to the main memory on lien 225. 222 is an original oscillator which determines the timing at which data is to be read out from the main memory and written into the main memory.

217 is a flag signal output issued from the processor board.

Figure 3:
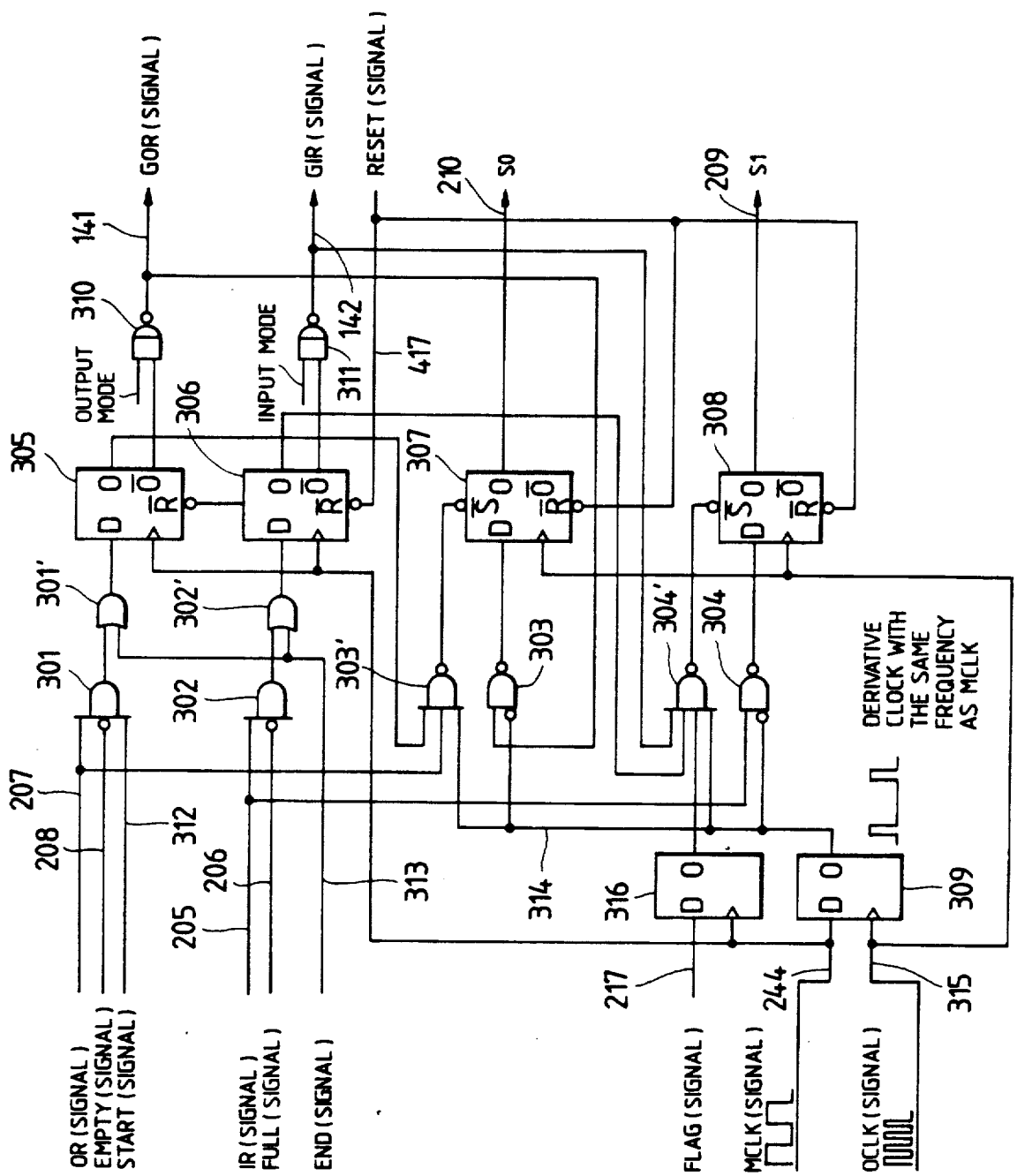
FIG. 3 is a diagram showing the configuration of a combinational logic circuit shown in FIG. 2.

FIG. 3 is a circuit diagram showing the detailed configuration of the combinational logic circuit 203.

First, in the initial state, both the EMPTY signal 208 and the IR signal 205 take a value "1", while both the FULL signal 206 and the OR signal 207 take a value "0", so that the buffer memories 202 of all the memory boards are set to empty.

A START signal 312 is a signal so controlled as to be raised to a value "1", after the control board 110 requests the input memory board to start reading of data and the thus read-out data in appropriate number are input to the buffer memory 202 of the input memory board.

When the OR signal 207, an inverted signal of the EMPTY signal 208 and the START signal 312 are all at a value "1" at an AND circuit 301, the Q output of a flip-flop circuit 305 is turned to "1" in response to the MCLK signal 144, and the resulting Q output of the flip-flop circuit 305 and a signal output indicative of reading (input mode) are ANDed by a NAND circuit 310 having an open-collector or open-drain type output, to drive the GOR signal 141 as a positive logic signal to "1". This GOR signal is connected to all the memory boards in a wired-OR manner. Therefore, if at least one input memory board is not yet ready to output data and does not drive the GOR signal 141 to "1", the value of the GOR signal 141 resultantly becomes "0", indicating that the operand data necessary for operation in the processor board are not yet prepared all together. At this time, the control board 110 monitors the value of the GOR signal 141 to set the flag signal 143 to a value "0" so that the processor board will not erroneously start processing of data, and also controls to keep the PCLK signal 145 from being generated. Further, the input memory board is so designed that by referring to the value of the GOR signal 141, it decides whether or not data is to be read out to the external input data bus 213. When the value of the GOR signal eventually turns to "1", indicating that the operand data necessary for operation in the processor board have been prepared all together, the control board 110 sets the value of the flag signal 143 to "1" upon rising of the first PCLK signal 145, thereby informing the processor board that data processing can be started. Note that there will not occur instability in timing, because the flip-flop circuit in the memory board always controls falling and rising of the GOR signal 141 to be synchronized with rising of the MCLK signal 144.

309 is a synchronous differentiating circuit which outputs a derivative clock signal 314 having one pulse per one cycle time of the MCLK signal 144, by synchronously differentiating the MCLK signal 144 with an OCLK (Original Clock) signal 315 as an internal reference clock. The presence of the circuit 309 will not fail to enable reading of data synchronously with the MCLK signal 144 even if the frequencies and phases of respective OCLK signals 315 are different among the memory boards. Strictly speaking, at this time, the derivative clock signal 314 is offset by one cycle time of the OCLK signal 315 at maximum. However, by selecting the cycle time of the MCLK signal 144 to be sufficiently longer than that of the OCLK signal 315, the timing offset can be absorbed by the register 204, resulting in no trouble.

There will now be described a concrete circuit for producing the shift-out signal 210 to decide the timing at which data is to be read out of the buffer memory 202, and the shift-in signal 209 used for writing data into the buffer memory 202. To begin with, operation of reading data from the buffer memory 202 is described.

When the Q output of the flip-flop circuit 305, the OR signal 207 and the derivative clock signal 314 all are at a value "1" at a NAND circuit 303', a Q output of the flip-flop circuit 307 is raised to "1" asynchronously with the OCLK signal 315 applied as a clock input to the flip-flop circuit 307. And a NAND circuit 303 produces the shift-out signal 210 which falls at the time the GOR signal 141 takes a value "1" and the derivative clock signal 314 takes a value "0". by so doing, the value of the shift-out signal 210 is held at a value "1" whenever the GOR signal 141 takes a value "0", resulting in a rest state where the data to be next read out is readable out of the buffer memory 202. This allows proper output of data even after return of the GOR signal 141 to "1".

The control board 110 makes a timing adjustment such that both the effective data read out of the input memory board and the flag signal 143 taking a value "1" are output to the processor board side for being issued to one of the pipe-lined processor boards at the next stage. Each of the pipe-lined processor boards processes the input data and delays the flag signal by a period of time necessary for producing the data therein, followed by transferring the flag signal 217 on the external output token bus connected to the next one of the pipe-lined processor boards or the output memory board.

Operation of writing data into the buffer memory 202 will be described below.

When a Q output of a flip-flop circuit 306, the GIR signal 142, a signal obtained by latching the flag signal 217 in a flip-flop circuit 316 with the MCLK signal 144 applied as a clock input thereto, and the derivative clock signal all are at a value "1" at a NAND circuit 304', a Q output of a flip-flop circuit 308 is raised to "1" asynchronously with the OCLK signal 315 applied as a clock input to the flip-flop circuit 308. And a NAND circuit 304 produces the shift-in signal 209 which falls at the time the IR signal 205 rakes a value "1" and the derivative clock signal 314 takes a value "0". By so doing, the value of the shift-in signal 209 is held at a value "0" whenever the IR signal 205 takes a value "0", resulting in a rest state where the data to be next written cannot be written into the input stage of the buffer memory 202 even if the IR signal 205 takes a value "1". As a result, it is possible to continuously write the correct data even after return of the GIR signal 142 to "1".

When the IR signal 205 and an inverted signal of the FULL signal 206 both are at a value "1" at an AND circuit 302, the Q output of a flip-flop circuit 306 is turned to "1" in response to the MCLK signal 144 as a clock input, and the resulting Q output of the flip-flop circuit 306 and a signal output indicative of writing (output mode) are ANDed by a NAND circuit 311 having an open-collector or open-drain type output, to drive the GIR signal 142 as a positive logic signal to "1". the remaining output memory boards similarly drive their GIR signals 142 to "1". therefore, if at least one output memory board fails to input data and does not drive the GIR signal 142 to "1", the pipe-line processing cannot be effected. Accordingly, the output memory board is so designed that by referring to the value of the GIR signal 142, it takes in data from the external output token bus 212 when the value of the GIR signal 142 is "1". further, the outputs of the AND circuits 301, 302 are ORed by OR circuits 301', 302', respectively, with an END signal 313 which indicates the completion of data processing previously designated by a host computer for the input memory board, so that the value of the GOR signal 141 or the GIR signal 142 will not fail to be driven to "1" whenever the internal operation of the input memory board has been ended. By so doing, even after completion of reading of all the data, it is controlled such that the PCLK signal 145 can be generated and the correct processing can be executed even in a period where the pipe-line processing has not ended due to a delay time on the pipe line.

With the circuit mentioned above, although the pipeline processing may be disordered in due course, reading and writing of the correct data can be performed when the processing is resumed after elapse of a certain time.

FIG. 4 is an internal block diagram of the control board 110. Designated at 401–403 are timing registers by which three separate data read out of the input memory boards synchronously with the MCLK signal 144 are stored therein and sent to the next processor board in response to the PCLK signal 145 as a clock input.

404 is a flip-flop circuit for producing the PCLK signal 145 as an operation clock signal for the processor boards in response to an MCLK×2 signal 415, as a clock signal, the frequency of which is two times that of the MCLK signal 144. It is so designed that whenever a Q output of a flip-flop circuit 406 or a flip-flop circuit 407 (both described later) takes a value "0", a Q output of the flip-flop circuit 404 is fed back to hold a level "0" in cooperation with an AND/OR circuit 408, and operation of the processor boards is prevented. In other cases, the flip-flop circuit 404 is operated with the same cycle and phase as those of the MCLK signal.

414 is an AND circuit which controls generation of the PCLK signal 145 and sets the value of the flag signal 143 to "1" only when the Q output ($Q_{GOR}$) of the flip-flop circuit 406 and the Q output ($Q_{GIR}$) of the flip-flop circuit 407 take both a value "1".

405 is a flip-flop circuit for storing an output of the AND circuit 414 and for producing the flag signal 143 in response to the PCLK signal 145 as a clock signal. Thus, when the $Q_{GOR}$ signal 431 and the $Q_{GIR}$ signal 432 both are at a value "1" for the first time, the value of the flag signal 143 is turned to "1" upon rising of the first PCLK signal 145.

406 is a flip-flop circuit which functions, in response to the MCLK signal 144 as a clock input and in cooperation with an AND/OR logic circuit 410, to feed back the $Q_{GOR}$ signal 431 to hold its value when the GOR signal 141 and the GIR signal 142 both are at a value "0", and to store the value of the GOR signal 141 with a delay of one clock when the GIR signal 142 takes a value "1" or when the $Q_{GOR}$ signal 431 takes a value "0".

407 is a flip-flop circuit which functions, in response to the MCLK signal 144 as a clock input and in cooperation with an AND/OR logic circuit 411, to feed back the $Q_{GIR}$ signal 432 to hold its value when the GOR signal 141 and the GIR signal 142 take both a value "0", and to store the value of the GIR signal 142 with a delay of one clock when the GOR signal 141 takes a value "1" or when the $Q_{GIR}$ signal 432 takes a value "0".

416 is a two-input NAND circuit which outputs "0" as a special state when the $Q_{GOR}$ signal 431 and the $Q_{GIR}$ signal 432 take both a value "0". In other cases, it outputs "1".

By so doing, the value of the GOR signal 141 or the GIR signal 142 which has turned to "0" at an earlier time is stored in the corresponding flip-flop circuit, while the Q output of the other flip-flop circuit is held. Also, when the GOR signal 141 and the GIR signal 142 take a value "0" concurrently, both of the flip-flop circuits store the corresponding external signals, respectively.

412 is a NAND circuit having an open-collector or open-drain type output, which serves to forcibly turn the value of the GIR signal 142 to "0" when the $Q_{GOR}$ signal 431 takes a value "0" and the NAND circuit 416 takes an output "0".

413 is a NAND circuit having an open-collector or open-drain type output, which serves to forcibly turn the value of the GOR signal 141 to "0" when the $Q_{GIR}$ signal 432 takes a value "0" and the NAND circuit 416 takes an output "1".

Therefore, during a period in which either one of the GOR signal 141 or the GIR signal 142 is kept at a value "0", the other signal is also forcibly turned to "0" to stop both read operation from the memory board to the external input data bus and write operation from the external output token bus to the memory board. Further, the PCLK signal 145 is stopped and operation of the processor board is interrupted with the flag signal 143 constantly held at a value "1".

Thus, by designing the sequential controller in the memory board such that the value of the GOR signal 141 or the GIR signal 142, which has turned to "0" at an earlier time, is returned to "1" again upon elapse of a certain time, the processor board will not also fail to resume its operation upon elapse of a certain time.

Figure 5A:
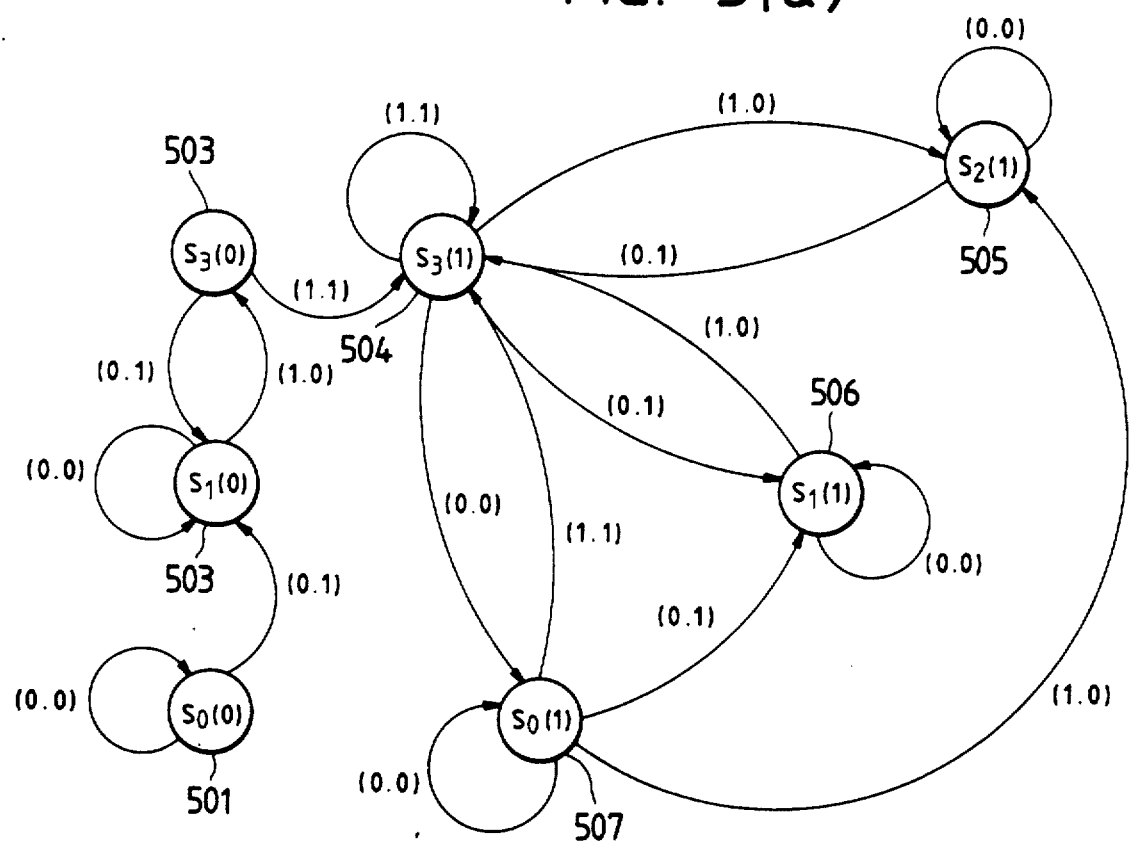
FIG. 5(a) is a state transition diagram of the sequential controller in the control board for controlling the data processing system shown in FIG. 1.

FIG. 5(a) shows a state transition diagram of the data processing system on the assumption of the hardware configuration as set forth above. An input is given by two bits of the GOR signal 141 and the GIR signal 142, and the internal status is represented by seven states determined according to the values of the $Q_{GOR}$ signal 431, the $Q_{GIR}$ signal 432 and the flag signal 143. Note that the numeral in a parenthesis associated with each symbol indicating the state represents the value of the flag signal 143, and the subscript at the lower right side of each symbol represents the value of ($Q_{GOR}$, $Q_{GIR}$) expressed in binary notation. Incidentally, a transition input is indicated by (GOR, GIR).

501 denotes an initial state $S_0(0)$ before start of data processing. Prior to start of processing, the flip-flop circuits 405, 406, 407 on the control board and the flip-flop circuits 305, 306, 307, 308 on all the memory boards are reset by the reset signal 417. Also, the buffer memories 202 on all the memory boards are reset to an empty state.

When the host computer issues an command to start processing of data in such an initial state, the MCLK signal 144 begins to oscillate. The GOR signal 141 takes a value "0" and the GIR signal 142 takes a value "1" at once, because the buffer memories 202 on all the memory boards are reset to an empty state in the initial state. This immediately brings about a state $S_1(0)$ denoted at 502. In this state, the $Q_{GOR}$ signal 431 takes a value "0" and the $Q_{GIR}$ signal 432 takes a value "1", whereby the value of the GIR signal 142 is forcibly turned to "0" by the NAND circuit 412 on the control board 110. At the time all the input memory boards have become ready to output data upon elapse of a certain time, the value of the GOR signal 141 turns to "1", which gives rise to a state $S_3(0)$ denoted at 503. Note that since the value of the GIR signal 142 is forcibly set to "0" in the state $S_1(0)$, the possible state for transition from the state $S_1(0)$ is limited to either one of the two states $S_1(0)$ and $S_3(0)$. In the state $S_1(0)$, the value of the flag signal 143 still remains at "0" and the PCLK signal 145 is not yet generated. If the value of the GOR signal 141 becomes "0" in the state $S_3(0)$ because of failed initial control of the buffer memory 202 in any input memory board, there occurs a return to the state $S_1(0)$. If the GOR signal 141 still takes a value "1", the control sequence transits to a state $S_3(1)$ denoted at 504. Note that the flag signal 143 takes a value "0" and the PCLK signal 145 is not oscillated in the state $S_3(0)$, so operation of the output memory boards is not permitted. Therefore, the GIR signal 142 will not fail to hold a value "1". Thus, the possible state for transition from the state $S_3(0)$ is limited to either one of the two states $S_1(0)$ and $S_3(1)$.

In the state $S_3(1)$, the flag signal 143 takes a value "1" and the pipe-lined processor boards carry out data processing in response to the PCLK signal 145. If the value of the GIR signal 142 of at least one output memory board turns to "0" in the state $S_3(1)$, there occurs a transition to a state $S_2(1)$ denoted at 505. In this state, because the $Q_{GOR}$ signal 431 takes a value "1" and the $Q_{GIR}$ signal 432 takes a value "0", the value of the GOR signal 141 is forcibly turned to "0" by the control board 110, thereby to inhibit reading of data from the input memory boards. When the value of the GIR signal 142 returns to "1" upon elapse of a certain time, the state before transition, i.e., the state $S_3(1)$, is restored. Note that because the value of the GOR signal 141 is forcibly set to "0" in the state $S_2(1)$, the possible state for transition from the state $S_2(1)$ is limited to either one of the two states $S_2(1)$ and $S_3(1)$.

If the value of the GOR signal 141 of at least one input memory board turns to "0" in the state $S_3(1)$, there occurs a transition to a state $S_1(1)$ denoted at 506. In this state, because the $Q_{GOR}$ signal 431 takes a value "0" and the $Q_{GIR}$ signal 432 takes a value "1", the value of the GIR signal 142 is forcibly turned to "0" by the control board 110, thereby to inhibit writing of data into the output memory boards. When the value of the GOR signal 141 returns to "1" upon elapse of a certain time, the state before transition, i.e., the state $S_3(1)$, is restored. Note that because the value of the GOR signal 141 is forcibly set to "0" also in the state $S_1(1)$, the possible state for transition from the state $S_1(1)$ is limited to either one of the two states $S_1(1)$ and $S_3(1)$.

If both the values of the GOR signal 141 and the GIR signal 142 concurrently turn to "0" in the state $S_3(1)$, there occurs a transition to a state $S_0(1)$ denoted at 507. In this state, while the $Q_{GOR}$ signal 431 and the $G_{GIR}$ signal 432 takes both a value "0", the values of the GOR signal 141 and the GIR signal 142 will not be turned to "0" by the NAND circuit 416 of the control board 110. When the value of the GOR signal 141 first turns to "1", the $Q_{GOR}$ signal 431 takes a value "1", resulting in a transition to the state $S_2(1)$. Alternatively, when the value of the GIR signal 142 first turns to "1", the $Q_{GIR}$ signal 432 takes a value "1", resulting in a transition to the state $S_1(1)$. If both the values of the GOR signal 141 and the GIR signal 142 concurrently turn to "1", the control sequence returns to the state $S_3(1)$.

From the above explanation, it has been shown that pipe-line processing of the processor boards can be executed without suffering from a deadlock state, by controlling the sequential controller in the control board with the 2-bit input given by the value of the GOR signal 141 indicating the status of the input memory boards and the value of the GIR signal 142 indicating the status of the output memory boards, such that the data processing sequence transits between the above seven states. As the time period in which the data processing sequence resides in the state $S_3(1)$ is prolonged, the bus occupation rate approaches 100%, resulting in the system which can be regarded as a highly efficient data processing system. Important matters in achieving such a system are the capacity of the buffer memory 202 of each memory board and the configuration of the sequential controller for controlling the buffer memory.

Figure 5B:
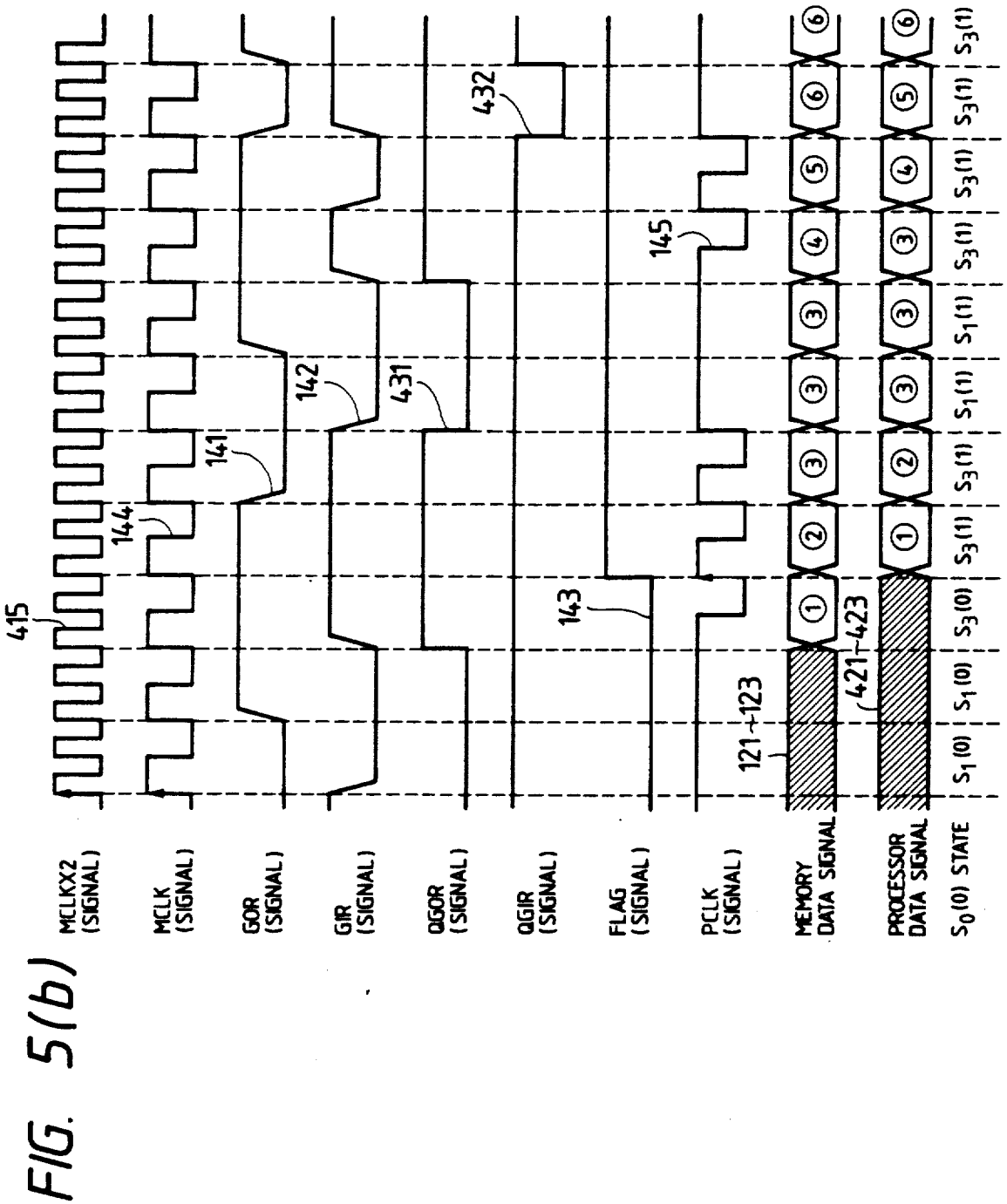
FIG. 5(b) is a timing chart for typical control signals and data buses.

FIG. 5(b) is a timing chart for typical control signals and data representing the operation of FIG. 5(a1) in accordance with the sequential controller of FIG. 4. Upon transition from the state $S_3(1)$ to the state $S_1(1)$, the PCLK signal 145 is effective and, therefore, operation of the processor boards is executed immediately after transition to the state $S_1(1)$. The data read out during this period is stored in the registers 401–403. Also, the data stored in the output stages of the processor boards upon transition to the state $S_1(1)$ is written into the memory boards upon transition from the state $S_1(1)$ to the state $S_3(1)$. As a result, there will not occur a discontinuity in the data stream.

FIG. 6 shows the configuration of the pipe-lined processor system when it is used to carry out a simple retrieval process as an example of data processing.

Designated at 601 is a data base in the form of a table comprising five items [A]-[E].

602 is an input memory apparatus storing only that data included in the item [A] and corresponding to the memory board 101 in FIG. 1. 603 is an input memory apparatus storing only that data included in the item [B] and corresponding to the memory board 102 in FIG. 1. Further, 604 is an input memory apparatus storing only that data included in the item [E] and corresponding to the memory board 103 in FIG. 1. In this example, explanation will be made on the assumption that one word length of each memory apparatus is larger than one record length of each item. It is also assumed that if one word length is smaller than one record length, the record is stored over plural memory apparatus.

Suppose a retrieval process is carried out on the condition of searching those record data in the item [E] which correspond to the record data "1" in the item [A] and the record data 'A' in the item [B], and also determining the number of those record data.

610, 620 and 630 are processors which correspond to the processor boards #1, #2 and #3 in FIG. 1, respectively. The data stored in the memory apparatus 602–604 are read out sequentially from the head record and then output to A, B and C buses, respectively.

A comparator 610 in the first-state processor 610 compares the data on the A bus with '1'. Upon match and mismatch, the comparator 610 outputs "1" and "0" to an A bus of the next processor 620, respectively. The data on the B, C and F buses are output to B, C and F buses of the next processor through delay circuits 612, 613 and 614 which have a delay time corresponding to a period of time necessary for the above comparison process, respectively.

A comparator 621 in the next processor 620 compares the data on the B bus with 'A'. Upon match and mismatch, the comparator 621 outputs "1" and "0", respectively. This output is ANDed by an AND circuit 625 with a signal resulted from delaying the data on the A bus through a delay circuit 626 which has a delay time corresponding to a period of time necessary for the comparison process, and the resulting logical product is output to an A bus of the next processor 630. The data on the B, C and F buses are output to B, C and F buses of the next processor through delay circuits 622, 623 and 624 which have a delay time corresponding to a period of time necessary for the above comparison process, respectively.

A counter circuit 631 in the next processor 630 is enabled to count when the flag signal on the F bus takes a value "1", and makes a count-up in response to the PCLK signal 145 when the data on the A bus takes a value "1". As a result, the retrieved data is sequentially written into an output memory apparatus 605, and the number of the retrieved data is recorded in the counter circuit 631.

In the foregoing embodiment, the main memory may be of a primary memory such as a semiconductor memory, or a secondary memory such as a magnetic disc. In the case of the semiconductor memory, the block length is given by the number of banks of a memory chip which can be used for reading and writing data in parallel. In the case of the magnetic disc, the block length is given by the number of records included in one sector or one track.

Figure 7A:
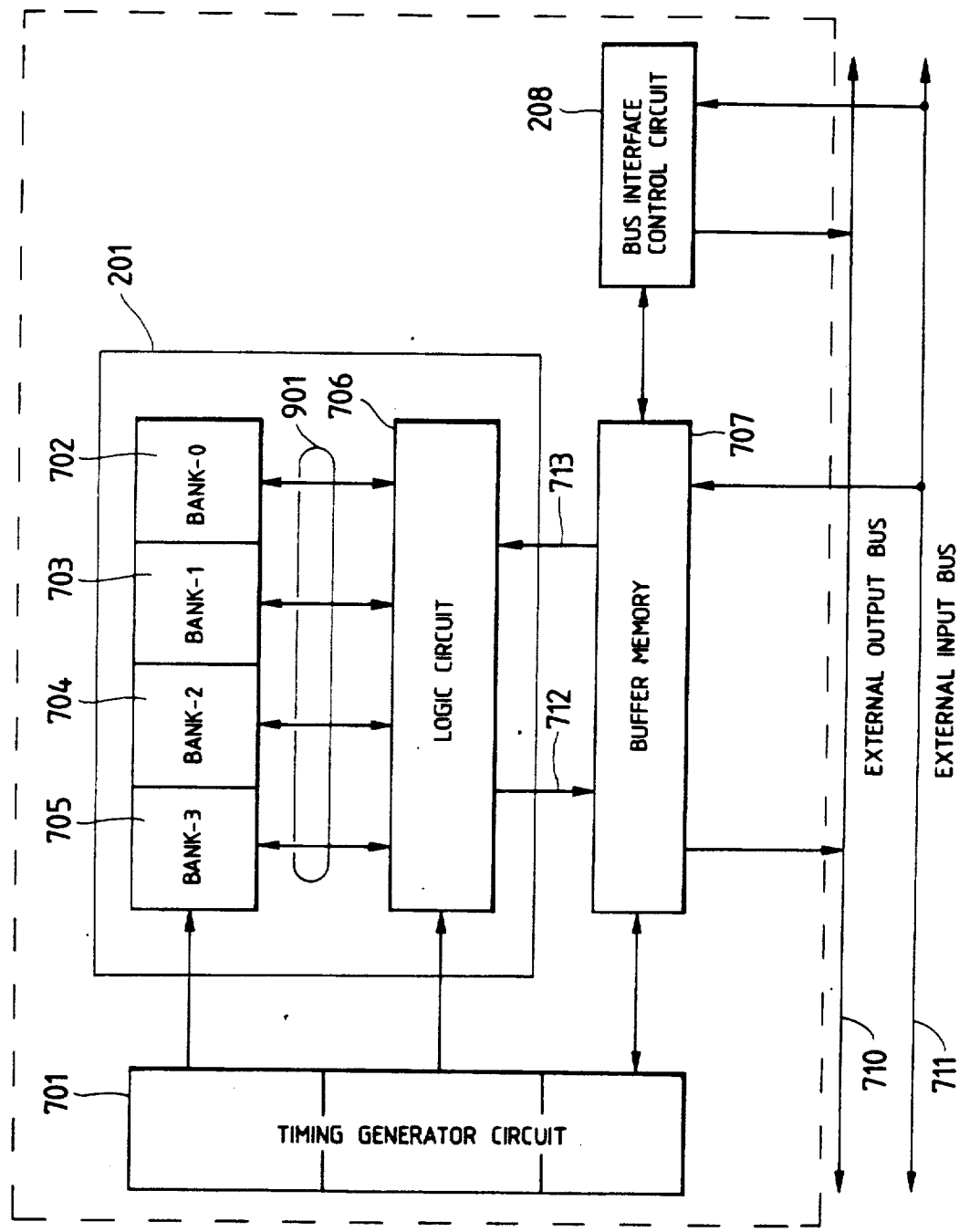
FIG. 7A is a block diagram showing the configuration of the memory board in case where dynamic memory elements are used as a main memory of the memory board in FIG. 1.

There will now be described an embodiment of the memory apparatus where dynamic memory elements are used as the main memory. Dynamic memory elements require to certainly access to all different memory addresses one or more times, a i.e., refresh operation, within a predetermined time. In this embodiment, such a refresh operation is transparent to the external system. Stated otherwise; the access operation is carried out without making the external system aware of the refresh operation. In the following description, image processing is taken as an example. FIG. 7A is a block diagram showing the configuration of the memory apparatus. In FIG. 7A, designated at 702–705 are a main memory chip module comprising P (four in the illustrated example) banks which are composed of dynamic memory elements for storing image data. Each image data is stored in the main memory chip module in the form divided into units of pixels. A logic circuit 706 has a function of parallel-to-serial converting the pixel data read out of the main memory chip module 702–705 in parallel and then outputting a (serial) signal 712 to be written into a buffer memory 707, and a function of inputting the data read out of the buffer memory 707 in the form of a (serial) signal 713 and then serial-to-parallel converting the signal 713 to be written into the memory chip module 702–705 in parallel in the form of a signal 901.

The buffer memory 707 is an FIFO type buffer memory which inputs the pixel data from the logic circuit 706 in the form of a signal 712 during reading of the pixel data to an external output bus 710, and outputs the pixel data to the logic circuit 706 in the form of a signal 713 at the timing of the main memory chip module during writing of raster-scanned data from an external input bus 711. As the buffer memory 707, FIFO memory "67413" manufactured by MMI Co., Ltd. may be used, for example.

In order that data can continuously be read/written irrespective of refresh operation of the main memory chip module even if transfer speeds on the external buses 710, 711 are varied to any speeds below a preset upper limit, the sequential controller subjects the main memory chip module 702–705 to state transition dependent on the status of the buffer memory 707 and the presence or absence of the refresh operation.

The sequential controller in FIG. 7A comprises a timing generator circuit 701 and a bus interface control circuit 708. The timing generator circuit 701 generates a timing signal used for the sequential control of the entire memory apparatus. The bus interface control circuit 708 controls the buffer memory 707 and the external output bus 710 so as to output data from the buffer memory 707 and monitor the signal from the external input bus 711, thereby controlling the buffer memory 707 so that data is input to the buffer memory 707.

Next, four states of the main memory chip module 702–705 and state transition therebetween will be described.

FIG. 8 is a state transition diagram of the internal status of the sequential controller.

The internal status of the sequential controller is divided into four states (i.e., initial state, normal memory access state, refresh state, and memory wait state) dependent on the presence or absence of normal memory access and refresh operation with respect to the main memory chip module 702–705. To meet the standards for access timing of dynamic memory elements, state transition is effected at the turning point of memory access.

The respective states will be described in detail below.

State 801: Initial State

The initial state 801 represents a state where no memory apparatus is activated by the external image processing system and no refresh operation is performed. When a refresh trigger signal is input in this state (in case of bus clock signal='0'), there occurs a transition to a refresh state 804. Also, there occurs a transition to a normal memory access state 802 upon input of a memory access request signal in the absence of refresh trigger signal (in case of bus clock-1 signal='1').

State 802: Normal Memory Access State

The normal memory access state 802 represents a state where the memory apparatus has been activated by the external image processing system, and read/write operation of image data is carried out. When a refresh trigger signal is input in this state (in case of bus clock signal='0'), there occurs a transition to the refresh state 804. Also, there occurs a transition to a memory wait state 803 upon input of a memory wait request signal in the absence of refresh trigger signal (in case of bus clock-1 signal='1', bus clock-2 signal='0').

State 803: Memory Wait State

The memory wait state 803 represents a state where the memory apparatus has been activated by the external image processing system, but normal memory access is inhibited. In this state, a refresh operation is not executed. When a refresh trigger signal is input in this state (in case of bus clock signal='0'), there occurs a transition to the refresh state 804. Also, there occurs a transition to the normal memory access state 802 upon input of a memory access request signal in the absence of refresh trigger signal (in case of bus clock-2 signal='1').

State 804: Refresh State

The refresh state 804 represents a state where the memory apparatus execute a refresh operation.

No matter in which state the main memory chip module exists, when the refresh trigger signal is input (in case of bus clock signal='0'), there occurs a preferential transition to the refresh state 804 so that refresh operation is carried out to prevent destruction of the memory contents. When the refresh trigger signal is cleared upon the completion of refresh, the control sequence returns to the state before transition to the refresh state 804.

The sequential controller having the above four internal states functions to ① supply a signal with a repetition cycle determined by a refresh time necessary for the dynamic memory elements, as the refresh trigger signal, to the main memory chip module 702–705 during the refresh state, ② detect that the buffer memory 707 has approached a full state, and then generate the memory wait request signal during reading in the normal memory access state, and ③ detect that the buffer memory 707 has approached an empty state, and then generate the memory wait request signal during writing in the normal memory access state.

Those signals necessary for control effected by the sequential controller will be described below in detail.

Figure 10:
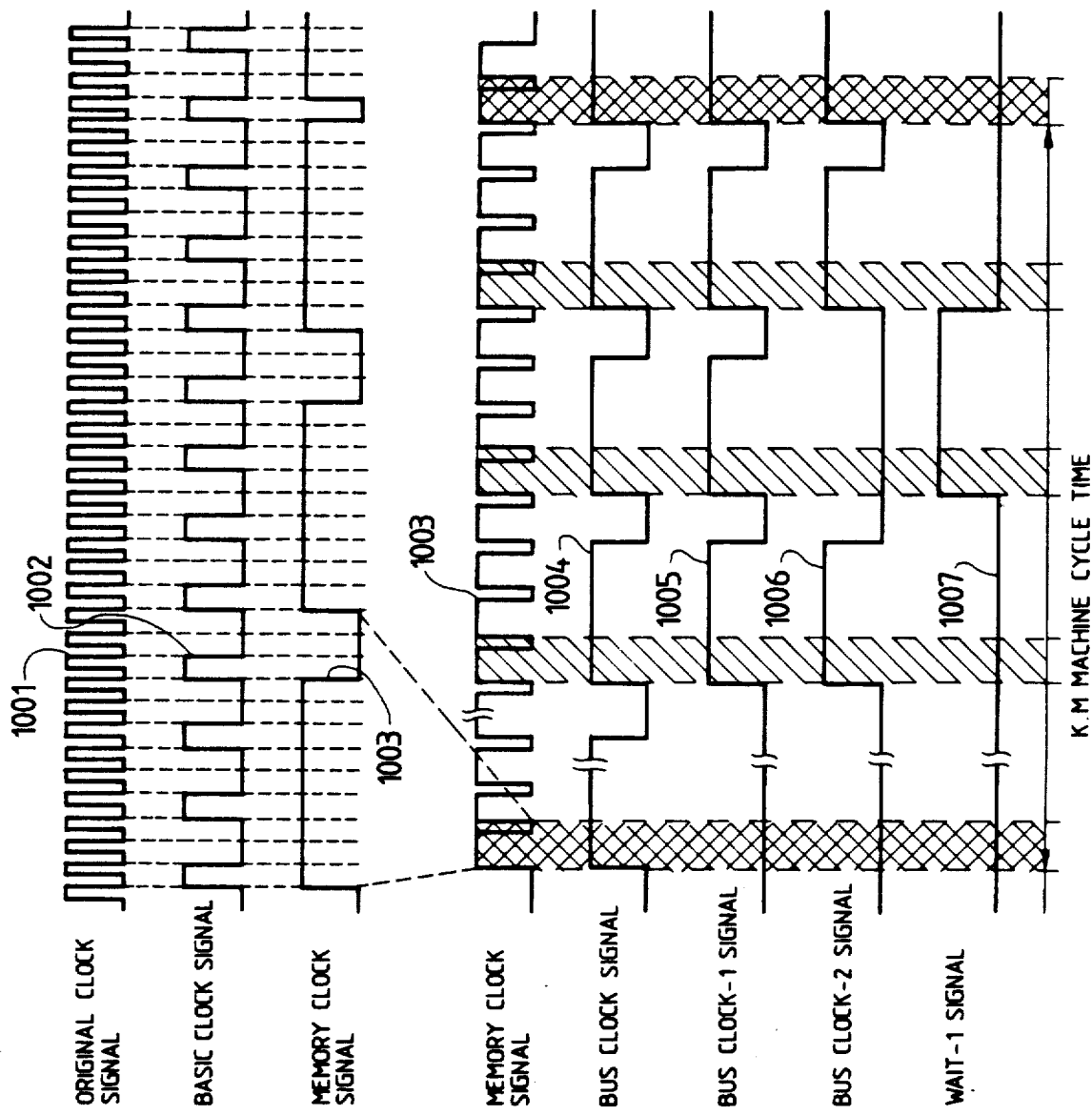
FIG. 10 is a timing chart of basic timing signals for use in the timing generator circuit.

FIG. 10 is a timing chart of basic timing signals used for controlling the memory apparatus of the present invention.

In FIG. 10, designated at 1001 is an original clock signal. The signals for controlling the memory apparatus are all created on the basis of this original clock signal.

1002 is a basic clock signal for specifying input/output operation of one data item between the buffer memory 707 and the logic circuit 7 are P basic clock signals when the main memory chip module has P banks. 1003 is a memory clock signal which has a time width corresponding to that of the P basic clock signals 1002. Within one cycle time of the memory clock signal 1003, P pixels in the main memory chip module are accessed in parallel Hereinafter, one cycle time of the memory clock signal 1003 will be referred to as a machine cycle.

1004 is a bus clock signal which has a time width corresponding to M cycles of the memory clock signal 1003. Hereinafter, one cycle time of the bus clock signal 1004 will be referred to as a bus cycle. In practice, normal memory access for reading/writing data is executed for R machine cycles (where $R \leq M - 1$) among the M machine cycles. Further, a refresh operation is executed for one machine cycle among the bus cycles (indicated by the cross-hatched portion).

In FIG. 10, it is assumed that a refresh operation is to be implemented at any time (herein, hatched portion) within a next machine cycle immediately after the bus clock signal 1004 has turned to a value '0'. Also, let the refresh trigger signal be given by (value of the bus clock signal 1004)='0'. Practically, a refresh operation reduces the effective transfer rate of the memory apparatus. In order to execute a refresh operation only with enough repetitions, therefore, the cycle of the refresh operation is set to be K times the bus cycle (where K is a positive integer). Here, K is so set that the period of time corresponding to $K \times M$ machine cycle meets the standards for the minimum time for a refresh interval of the memory elements used.

1005 in FIG. 10 is a signal indicating whether or not normal memory access is to be executed with respect to the main memory chip module 702-705 in the succeeding machine cycle. Hereinafter, this signal will be referred to as a bus clock-1 signal.

1006 is a memory access request signal. Hereinafter, this memory access request signal 1006 will be referred to as a bus clock-2 signal.

Finally, 1007 is a memory wait request signal. Hereinafter, this memory wait request signal 1007 will be referred to as a wait-1 signal.

Incidentally, FIG. 10 shows the case of $M=4$, $R=3$ and $K=4$.

The relationship between state transition (see FIG. 8) in the sequential controller of the memory apparatus and the various timing signals (see FIG. 10) will now be described in detail.

State 801: Initial State

Turning of the value of the bus clock signal 1004 to '0' brings about a transition to the refresh state 804. Turning of the value of the bus clock-1 signal 1005 to '1' brings about a transition to the normal memory access state 804.

State 802: Normal Memory Access State

When the wait-1 signal 1007 is turned to a value '0' and the bus clock-2 signal 1006 takes a value '1', the control sequence remains in the normal memory access state 802. When the bus clock signal 1004 turns to a value '0', it transits to the refresh state 804. When the wait-1 signal 1007 turns to a value '1', the bus clock-1 signal 1005 takes a value '1' and the bus clock-2 signal 1006 takes a value '0', there occurs a transition to the memory wait state 803.

State 803: Memory Wait State

When the wait-1 signal 1007 is turned to a value '1', the bus clock-1 signal 1005 takes a value '1' and the bus clock-2 signal 1006 takes a value '0', the control sequence remains in the memory wait state 803. When the bus clock-2 signal 1006 turns to a value '1', it transits to the normal memory access state 802. When the bus clock signal 1004 turns to a value '0', it transits to the refresh state 804.

State 804: Refresh State

When the wait-1 signal 1007 takes a value '0' and the bus clock-2 signal 1006 turns to a value '1', the control sequence transits to the normal memory access state 802. When the bus clock-1 signal 1005 takes a value '1' and the bus clock-2 signal 1006 takes a value '0', it transits to the memory wait state 803. When the bus clock signal 1004 turns to a value '1', there occurs a return to the state before transition to the refresh state 804.

How to control the above four states through a practical input/output operation will be explained in detail.

To begin with, operation of the memory apparatus in case of supplying data from it to the external bus 710 is described.

Two states of the buffer memory, i.e., normal and abnormal states, are defined on the basis of factors which cause state transition between the two states (that is, memory access state 802 and memory wait state 803) of the sequential controller. Here, the abnormal state indicates a nearly-full state when the number of data input to the buffer memory 707 has become above $(1 - 1/N)$ times the total capacity thereof during reading out of the memory apparatus, and indicates a nearly-empty state when it has become below $1/N$ times the total capacity during writing into the memory apparatus. The states other than the abnormal state are defined as a normal state.

Below is an explanation of why the abnormal state should be considered.

As mentioned above, state transition in the sequential controller is executed at the turning point of memory access. Accordingly, even upon detection of the abnormal state, one memory access time is required at maximum until input/output operation of the buffer memory 707 can be stopped actually. It should be, therefore, considered to avoid the need of immediately stopping input/output operation with respect to the buffer memory 107, even if the buffer memory 107 is brought into the abnormal state. To cope with this, the buffer memory 707 is so designed as to not reach a completely-empty state or a completely-full state. For this reason, the nearly-empty and nearly-full states are detected as an abnormal state.

To put it concretely, when the number of data stored in the buffer memory 707 has reached a nearly-full state (abnormal state), the wait-1 signal 1007 turns to a value '1'; causing a transition to the memory wait state 803. Since no data is input to the buffer memory 707 in the memory wait state 803, the number of data in the buffer memory 707 is reduced gradually. Therefore, upon elapse of a certain time, the buffer memory 707 gets out of a nearly-full state and returns to a normal state. Then, the wait state is cleared at the turning point of the next machine cycle.

While the foregoing is the operation effected on the buffer memory side, it is also required to control the memory apparatus such that it will not come into the state incapable of sending out data (i.e., contrary abnormal state) in the memory wait state 803, in order to continuously supply data to the external bus without fail.

In view of the above, the volume L of the buffer memory 707 is set as follows.

Firstly, the following relationship is established;

$$L > N \cdot P \ldots \quad (1)$$

(because of the requirement that the quantity P of data capable of being written into the main memory chip module 702-705 per one time should be smaller than a limit L/N for the abnormal state).

Secondly, the following relationship is established because of the requirement that the processing speed of effective data in the memory apparatus should be higher than the data processing speed of the external image processing system;

$$(1/Tb) \cdot (R/M) > 1/Tp \ldots \quad (2)$$

where Tb is one cycle time of the basic clock signal 1002 and Tp is one cycle time of the clock signal 1104 for the external image processing system.

Thirdly, a period of time in which the memory apparatus is kept at the memory wait state 803 should be shorter than that taken for the memory apparatus to come into the contrary abnormal state.

Those three requirements will be described below.

The following two cases are employed as a way of clearing the memory wait state.

Case 1:

When the buffer memory 707 is returned to the normal state, the memory wait state 803 is cleared immediately.

Case 2:

When the buffer memory 707 is returned to the normal state and the machine state turns to one immediately before transition to the memory wait state, the memory wait state 803 is cleared.

The above Case 1 requires two machine cycles at a minimum as a period of time taken from transition to the memory wait state to the clearing thereof, because a refresh operation is inserted in the worst case. Accordingly, the following relationship should be met as the third requirement:

$$[1-(1/N)-(1/N)] \cdot L \cdot Tp > P \cdot Tb \cdot 2 \ldots \quad (3)$$

The above Case 2 requires M machine cycles at a minimum as a period of time taken, from transition to the memory wait state to the clearing thereof. Accordingly, the following relationship should be met as the third requirement:

$$[1-(1/N)-(1/N)] \cdot L \cdot Tp > P \cdot Tb \cdot M \ldots \quad (3')$$

Above is an explanation of the third requirement.

To sum up the foregoing results, in the control method of the Case 1, an upper limit of the minimum value Lmin of L is set as follows for the image processing system having an arbitrary operation frequency on the basis of the equations (1), (2) and (3);

$$Lmin = Max[(P \cdot R \cdot 2 \cdot N)/\{M \cdot (N-2)\}, P \cdot N] \ldots \quad (4)$$

where Max[ , , ] means to adopt larger one of two values.

Also, in the control method of the Case 2, an upper limit of the minimum value Lmin of L is set as follows for the image processing system having an arbitrary operation frequency on the basis of the equations (1), (2) and (3');

$$Lmin = Max[(P \cdot R \cdot N)/(N-2), P \cdot N] \ldots \quad (4')$$

A practical example of the equations (4) and (4') will now be set forth.

Given $N=8$, $P=4$, $M=4$ and $R=3$, the minimum value of L may be set to 32 words from the second term of the equations (4) and (4') in both the Cases 1 and 2. In other words, the minimum value of 32 words enables continuous reading of data for the data processing system having an arbitrary operation frequency. Where one cycle time Tb of the basic clock signal is close to one cycle time Tp of the external system, R must be set to have a larger value from the equation (2) because M, R are each positive integers. For the Case 2, therefore, the first term (lefthand value of ,) in the right side of the equation (4') becomes larger than the second term (righthand value of ,) therein, and the value of Lmin is only required to be increased correspondingly.

The foregoing explanation is concerned with a detailed example of the sequential controller in case of outputting data from the memory apparatus to the external bus.

There will now be described in detail a state transition in the sequential controller when data is supplied from the external bus 111 to the memory apparatus, i.e., in case of a write operation.

An abnormal state in this state is defined as one where the number of data stored in the buffer memory 707 has reached a nearly-empty state, i.e., has fallen below 1/N times the total capacity of the buffer memory 707.

When the number of data items stored in the buffer memory 707 has reached a nearly-empty state at any time, there occurs a transition to the memory wait state 803 at the turning point of the next machine cycle. Since no data is read out of the buffer memory 707 in the memory wait state 803, the number of data items in the buffer memory 707 is increased gradually. As a result, upon elapse of a certain time, the buffer memory 707 gets out of a nearly-empty state and returns to a normal state at the turning point of the next machine cycle. As with the case of reading, there are two methods of clearing the wait state.

Case 1:

When the buffer memory 707 is returned to the normal state, the memory wait state 803 is cleared immediately. Unlike the case of reading, a limitative requirement is added for transition to the memory wait state 803 in this method. This requirement will be described later.

Case 2:

When the buffer memory 707 is returned to the normal state and the machine state turns to one immediately before transition to the memory wait state, the memory wait state 803 is cleared. In this method, as with the case of reading; it is required to store the machine state immediately before transition to the memory wait state 803.

In both these Cases 1 and 2, preventing the machine state from being brought into the contrary abnormal state, i.e., nearly-full state, requires L to meet the requirement of the above equation (4) for the Case 1 and to meet the requirement of the above equation (4') for the Case 2, as with the case of reading.

Above is an explanation of a state transition in the case of supplying data from the external bus to the memory apparatus.

In the foregoing, there has been described in detail the manner of state transition in the sequential controller for continuously inputting and outputting data into and from the external data processing system, in two cases of read and write operation.

Next, a timing generator circuit for operating the sequential control circuit will be described in detail.

Figure 7C:
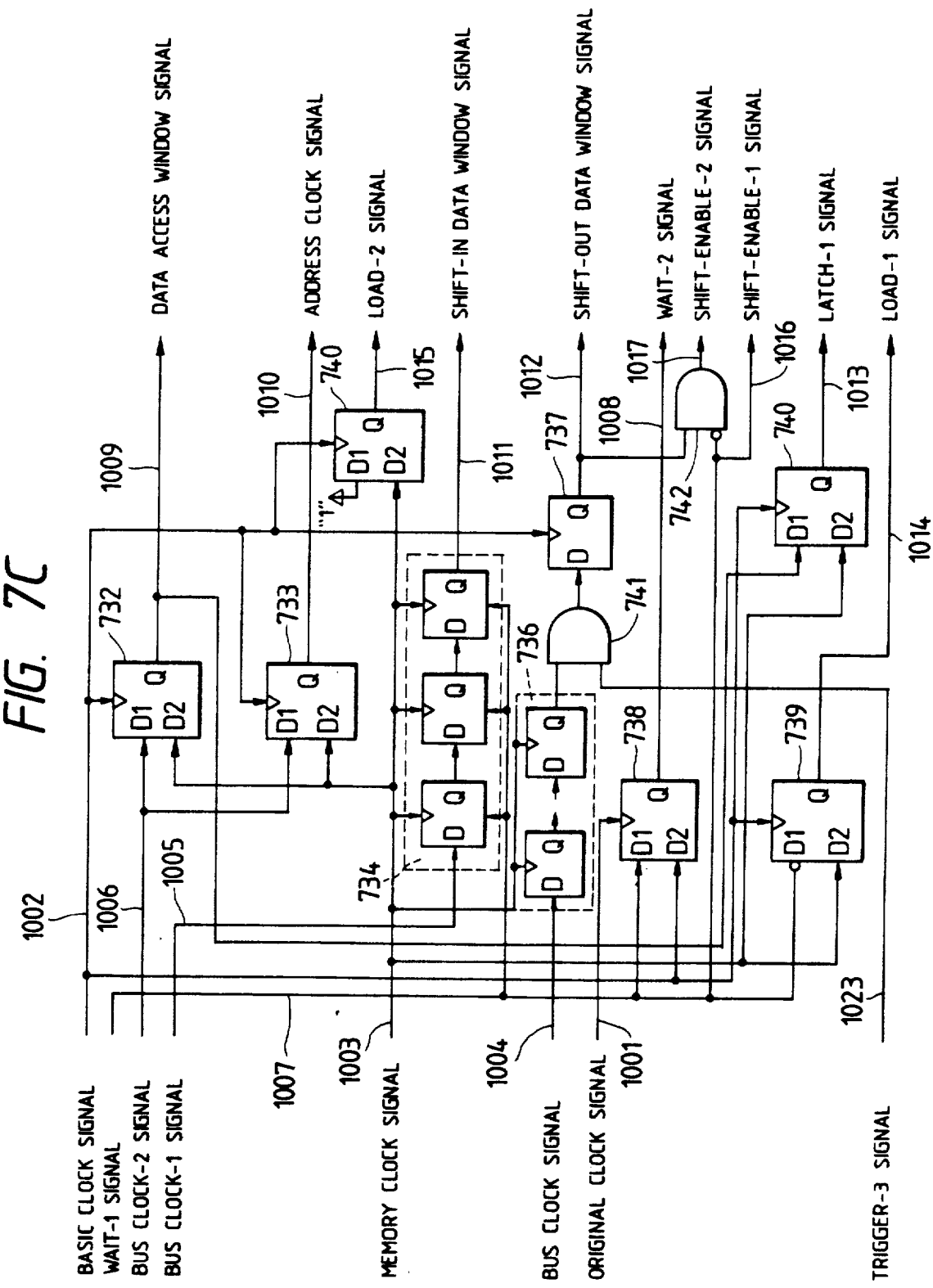
Figure 7D:
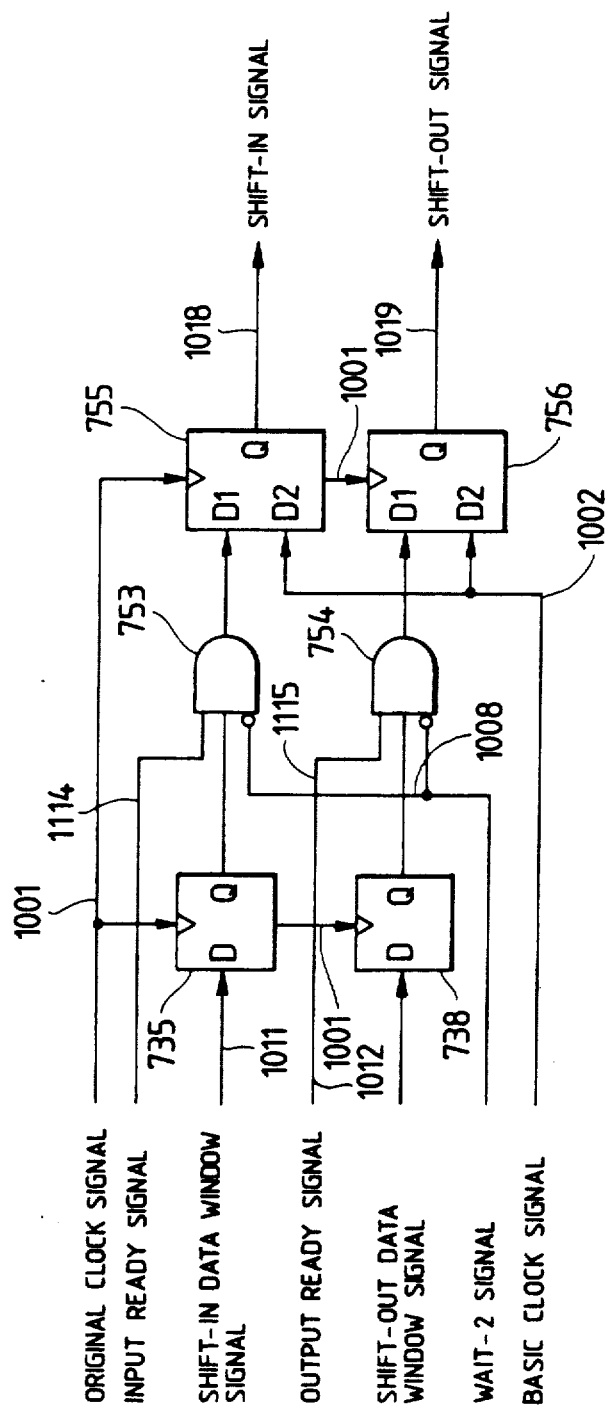

FIG. 7B is a block diagram of the timing signal generator circuit in FIG. 7A, and FIGS. 7C and 7D are block diagrams of timing circuitries in the timing signal generator circuit for generating control signals for the main memory chip module and the logic circuit. FIGS. 7C and 7D will be described later.

As shown in FIG. 7B, the timing generator circuit 701 comprises an original clock oscillator 720, a wait control circuit 728, a comparator 727, register circuits 724, 725, 726, 749, a selector 730, a division by 3 circuit 721, division by 4 circuits 722 and 723, and AND circuits 729, 731.

The basic clock signal 1002 is obtained through the division by 3 circuit 721 which divides the frequency of the original clock signal 1001 by 3. The memory clock signal 1003 is obtained through the division by 4 circuit 722 which decodes an output bit of a P-bit (here P=4) counter circuit with the basic clock signal 1002 applied as a clock input thereto. The bus clock signal 1004 is obtained through the division by 4 circuit 723 which decodes an output bit of an M-bit (here M=4) counter circuit with the memory clock signal 1002 applied as a clock input thereto.

The bus clock-1 signal 1005 is obtained through and AND circuit 729 in which the bus clock signal 1004 and a trigger-4 signal 1024 are ANDed. Then, the bus clock-2 signal 1006 is obtained through an AND circuit 731 in which the bus clock-1 signal 1005 and an inverted signal of the wait signal 1007 are ANDed.

A trigger-1 signal 1021 is a positive logic signal which indicates reading of data from the main memory chip module 702-705 to the external data processing system.

A trigger-2 signal 1022 is obtained through the flip-flop circuit 724 as a signal obtained by holding the trigger-1 signal 1021 in response to the rising edge of the memory clock signal 1003.

A trigger-3 signal 1023 is obtained through the flip-flop circuit 725 as a signal obtained by holding a positive logic signal 1113, which indicates that the number of data input to the buffer memory 707 exceeds P piexes, in response to the rising edge of the memory clock signal 1003. The signal 1113 can be replaced by an inverted signal of an empty signal 1111 as will be seen from the above equation (11).

A trigger-4 signal 1024 is obtained through a selector 730 which selects the trigger-2 signal 1022 in case of reading data from the main memory chip module 702-705, and a signal resulted from delaying the trigger-3 signal 1023 by one machine cycle through a delay circuit 749, which serves for timing adjustment, in case of writing data to the main memory chip module 702-705.

The register circuit 726 stores the bus clock signal 1004 sequentially with delay of one machine cycle when the wait-1 signal 1007 takes a value '0', and holds the content of the register circuit 726 when the wait-1 signal 1007 takes a value '1'.

A correspondence signal 1025 takes a value '1' when the value of the bus clock signal 1004 corresponds with that of the register circuit 726 in the comparator 727, and a value '0' in the absence of correspondence.

The wait-1 signal 1007 is obtained through the wait control signal 728 which detects, in response to rising of the memory clock signal 1003 after the trigger-4 signal 1024 has turned to '1', a full signal 1111 indicating that the number of data input to the buffer memory 707 has become above $[1-(1/N)]$ times the total capacity thereof, an empty signal 1112 indicating that it has become below $(1/N)$ times the total capacity, the correspondence signal 1025, or a shift-out data window signal 1012 as a limitative requirement for the Case 2 while writing.

Figure 9:
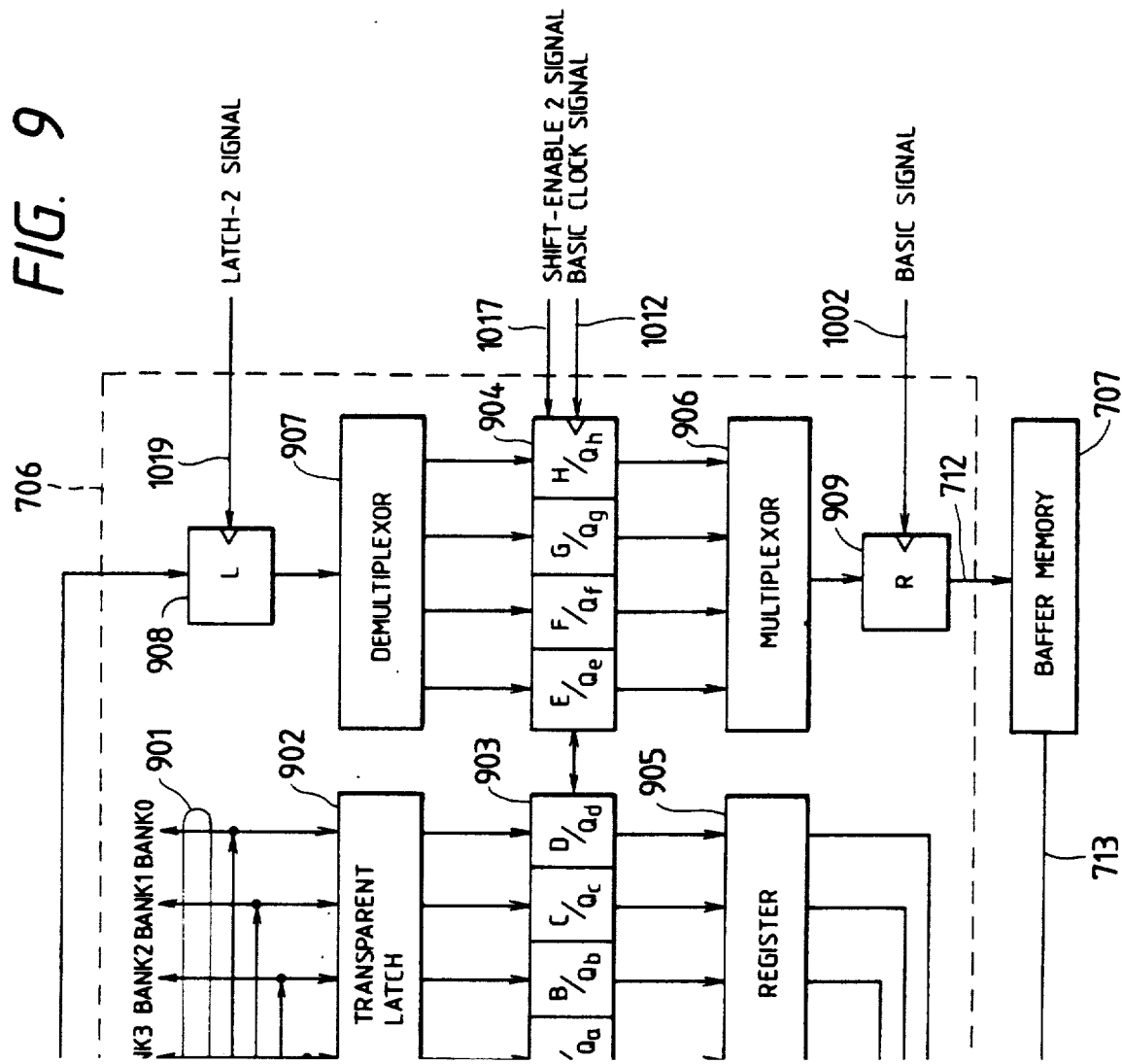
FIG. 9 is a detailed block diagram of the logic circuit in FIG. 7A.

Next, FIG. 9 is a block diagram of the logic circuit in FIG. 7A.

The logic circuit 706 has a function of inputting and outputting data between the main memory chip module 702-705 and the buffer memory 707.

First, a read operation for supplying data to the external bus 710 will be explained.

To begin with, there will be described an operation of the logic circuit 706 for inputting P pixel data, which have been read out of the main memory chip module 702-705 in parallel, to the buffer memory 707 serially. The P pixel data 901 read out in parallel are stored into a transparent latch circuit 902 upon falling of a latch-1 signal 1013 after one machine cycle. Note that the transparent circuit is a circuit which latches input data in response to a level and falling of a latch signal. Along with the latch circuit 902, a latch circuit 908 is also of transparent type. These latch circuits are different in operation from a D type latch circuit (which latches input data in response to rising of a latch signal) such as a latch circuit 909 and latch circuits 1101, 1102, 1103, etc. shown in FIGS. 11A and 11B.

Having been latched to the transparent latch circuit 902, the P pixel data 901 is written in parallel to a shift register 903 upon rising of a load-1 signal 1014. Then, the shift registers 903, 904 perform a shift operation with the basic clock signal 1002 applied as an clock input thereto, so that all the pixel data read out previously is shifted into the shift register 904 after one machine cycle. A multiplexer 906 selects the first P pixel data which is stored in a register 909 immediately upstream of the buffer memory 707 upon rising of the next basic clock signal 1002.

FIGS. 11A and 11B are block diagrams of peripheral circuits of the buffer memory in FIG. 7A. The data 112 stored in the register 909 of FIG. 9 is written into the buffer memory 707 on a datum basis by datum in response to a shift-in signal 1018 shown in FIG. 10A.

In order to properly write only the effective data into the buffer memory 707 other than the refresh data, a data window signal is required which specifies a write-enable period for the data 712 stored in the register 909. for this purpose, control is required such that the data 901 read out during the refresh operation is input to the shift registers 903, 904, but the data window signal is set to a value '0' at the time that data reaches the register 909, thereby preventing it from being written into the buffer memory 707.

Further, in the memory wait state 803, it is required to stop operation of the shift registers 903, 904 and the shift-in operation for the buffer memory 707. Accordingly, a shift-enable-1 signal 1016 and a shift-enable-2 signal 1017 are both turned to a value '0' for stopping operation of the shift registers 903, 904. shift-in operation of data for the buffer memory 707 is also stopped.

Besides, in the machine cycle immediately after transition to the memory wait state 803, the normal memory cycle or refresh operation is executed. The memory data 901 read out at this time is stored in the transparent latch 902 upon falling of the latch-1 signal 1013. Furthermore, immediately after transition to the memory wait state 803, the data 712 stored in the register 909 is input to the buffer memory 707.

When a full signal 1112 takes a value '0' upon elapse of a certain time after transition to the memory wait state 803, the buffer memory 707 is returned to a normal state and the memory wait state is cleared at the turning point of the next machine cycle.

For the Case 1, since the read-out data is already input to the transparent latch 902 and the shift registers 903, 904, it is necessary to hold the shift-in data window signal 1011 by the wait-1 signal 1007 (see FIGS. 7B and 7C).

For the Case 2, unlike the Case 1, it is not necessary to hold the sift-in data window signal 1011 (see FIG. 7C) only during the time the wait-1 signal 1007 takes the value '1'. But, the machine state immediately before transition to the memory wait state is required to be stored in the register circuit 726.

Upon clearing of the memory wait state 803, the shift-enable-1 signal 1016 and the shift-enable-2 signal 1017 both are set to a value '1', so that the shift registers 903, 904 resume their operation from rising of the next basic clock signal 1002 and shift-in operation of data for the buffer memory 707 is also resumed after one basic clock time.

Although the machine cycle immediately after clearing of the memory wait state 803 is not executed, the data which has been stored in the transparent latch 902 upon transition to the memory wait state 803, is written into the shift register 903 upon rising of the load-1 signal 1014 after one machine cycle.

Further, upon detecting a signal 1113 which indicates that data not less than P pixels is input to the buffer memory 707, the data is read out in response to the shift-out signal synchronously with a clock signal 1104 of the external data processing system, stored in a transparent latch 1101 upon falling of a latch-3 signal 1019, and then stored in a register 1102 upon rising of the clock signal 1104 for being output to the external bus 710. By so doing, even if data is not input during the cycle subsequent to a previous one where the first P pixel data has been input, because of coincidence with the period of the shift-in data window signal 1011 taking a value '0' in the worst case, the buffer memory 707 can be prevented from coming into a completely-empty state temporarily, thereby to enable a continuous read operation of data.

Next, a write operation to receive data from the external bus 711 will be described in detail.

In FIG. 11B, the data on the external bus 711 is stored in a register 1103 upon rising of the clock signal 1104. Then, only the effective data is selected and written into the buffer memory 707 in response to the shift-in signal synchronously with the clock signal 1104. When the data first written reaches an output stage of the buffer memory 707 upon elapse of a certain time, an output ready signal 1115, indicating that data can be output, turns to a value '1' asynchronously. Then, the trigger-3 signal 1023 is turned to a value '1' at the appropriate timing, and the data 713 is read out from the buffer memory 707 on the basis of pixel by pixel in response to the shift-out signal 1019 for being stored in the transparent latch 908 upon falling of the latch-2 signal 1019.

Next, there will be described in detail an operation of the logic circuit 706 for writing the data 713, which has been serially read out of the buffer memory 707, into the main memory chip module 702-705 in parallel.

After a demultiplexer 907 shown in FIG. 9 has selected one register area of the shift register 904 in which the data 713 is to be written, the data 713 is written into that register area upon rising of the next basic clock signal 1002. Incidentally, shift operation is performed in the other register areas not selected. When the P pixel data has been moved to the shift register 903 after one machine cycle, the P pixel contents of the shift register 903 are stored in the register 905 upon rising of the load-2 signal 1015 in parallel. Then, during the next machine cycle, the P pixel contents of the register 905 are written into the main memory chip module 702-705 in parallel.

As with the case of reading, a data window signal is required for specifying the timing at which the data 713 can be read from the buffer memory 707 into the transparent latch 908. That timing should meet three requirements.

First, the data should be read at a timing to bypass the refresh operation. Thus, in the above reading process, the effective data is required to be read at such timing that the machine cycle subsequent to a previous one, where that data has been stored in the register 905, will not coincide with the refresh cycle.

Secondly, the P pixel data capable of being accessed in parallel during one machine cycle should be read at such timing that the data is concurrently written into the main memory chip module 702-705. To this end, where the P pixel data capable of being accessed in parallel during one machine cycle is fixed in position on the screen, some expedient is incorporated for writing the pixels in parallel from a slightly offset position. More specifically, rather than shifting the timing to read the effective data from the buffer memory 707, the demultiplexer 907 is designed to shift a data input location, thereby making it possible to read data at the predetermined timing constantly from whatever position the data is located.

Thirdly, it is required to avoid an empty state of the buffer memory 707 even temporarily at the start of reading of data from the buffer memory 707, because the value of the operation cycle Tb of the main memory chip module 702-705 is larger than that of the operation cycle Tp of the external system. Therefore, reading should be started after the signal 1113 indicating that data not less than P pixels is input to the buffer memory 707 has turned to a value '1'.

For the reason, this selector 730 in FIG. 7B selects the trigger-4 signal 1024 which is obtained by delaying the trigger-3 signal 1023 by one machine cycle.

Meanwhile, the above-mentioned determination of the timing to read data from the buffer memory 707 is to expect the event in future time, and therefore cannot generally be implemented in the form a circuit. But, since one bus cycle time is set to be longer than one machine cycle time by integer times, expectation of the future event is practically equivalent to delay of the past event and can be realized using a circuit.

In case of writing, unlike the above reading process, write and shift operations on the shift register 904 should be inhibited when the shift-out data window signal 1012 shown in FIG. 9 takes a value '0'.

Also in the memory wait state 803, operation of the shift registers 903, 904 and the shift-out operation for the buffer memory 707 should be stopped.

Accordingly, it is so controlled that the shift-enable-1 signal 1016 and the shift-enable-2 signal 1017 take both a value '0', and the wait-2 signal 1008 takes '0'.

Besides, since the shift-out operation occurs immediately after transition to the memory wait state 803, the data 713 read out of the buffer memory 707 as shown in FIG. 11B is stored in the transparent latch 908 shown in FIG. 9 upon falling of the latch-2 signal 1019.

When the empty signal 1111 turns to a value '0' upon elapse of a certain time after transition to the memory wait state 803, the buffer memory is returned to a normal state.

In both the Cases 1 and 2, with the memory wait state 803 being cleared, the shift registers 903, 904 resume their operation from rising of the next basic clock signal 1002, and reading of data from the buffer memory 707 also resume after one basis clock time.

Although the machine cycle immediately after clearing of the memory wait state 803 is not executed, the data which has been stored in the transparent latch 908 upon transition to the memory wait state 803, is written into one register area of the shift register 904 after one machine cycle.

At this time, for the Case 1, the memory wait state requires clearing under the conditions that the buffer memory 707 is returned to a normal state in the machine state having the same attribute as that at the time of transition to the memory wait state 203.

Herein, that attribute is uniquely determined by the value '0' or '1' of the shift-out data window signal 1012 at the time of rising of the memory clock signal 1003.

The reason for adding such a limitative requirement is that if the machine states at the times of starting and clearing of the memory wait state 803 have different attributes, discontinuity of data would be caused in the read operation of the buffer memory 707 and shift operation of the shift registers 903, 904 after clearing of the memory wait state 803, resulting in a fear that the same data may be shifted successively or data may be dropped.

The above limitative requirement means that the state transition should not be performed when the machine state having the same attribute is reached at last after one round of the bus cycle. At the turning point of the machine cycle in such machine state, the shift-out data window signal 1012 takes a value '0' and hence access to the buffer memory 707 will not be performed.

Consequently, even under the above limitative requirement, the problem that the buffer memory 707 is brought into a completely empty state hardly occurs. In case of writing, however, the control method of the Case 1 is not perfect.

Finally, circuits for generating read/write control signals will be described in detail.

FIGS. 7C and 7D show circuit diagrams for generating control signals necessary to properly execute read/write operations.

In FIG. 7C, a data access window signal 1009 is a signal indicating that the normal memory access state 802 is being executed. This signal is obtained through a flip-flop circuit 732 with the basic clock signal 1002 applied as a clock input thereto, in the form of a level signal which has a value '1' only for the next machine cycle time upon rising of the memory clock signal 1003 when the bus clock-2 signal 1006 takes a value '1'.

An address clock signal 1010 is a signal for updating an address of the main memory chip module. This signal is obtained through a flip-flop circuit 733 with the basic clock signal 1002 applied as a clock input thereto, in the form of a pulse signal which holds a value '1' only for one basic clock time upon rising of the memory clock signal 1003 when the bus clock-2 signal 1006 takes a value '1'. Accordingly, parallel access of P pixels is performed to the main memory chip module through the normal memory access other than a refresh operation, so that the address is updated.

The latch-1 signal 1013 is obtained through a flip-flop circuit 740 with the basic clock signal 1002 applied as a clock input thereto, in the form of a pulse signal which falls upon rising of the memory clock signal 1003 when the data access window signal 1009 takes a value '1'.

The latch-2 signal 1019 is identical to the shift-out signal 1019.

The load-1 signal 1014 is obtained through a flip-flop circuit 739 with the basic clock signal 1002 applied as a clock input thereto, in the form of a pulse signal which rises upon rising of the memory clock signal 1003 when the wait-1 signal 1007 takes a value '0'.

The load-2 signal 1015 is obtained through a flip-flop circuit 740 with the basic clock signal 1002 applied as a clock input thereto, in the form of a pulse signal which rises upon rising of the memory clock signal 1003 when the wait-1 signal 1007 takes a value '0'.

The wait-2 signal 1008 is obtained through a delay circuit 738 with the original clock signal 1001 applied as a clock input thereto, in the form of a signal resulted from delaying the wait-1 signal 1007 by one basic clock time.

The shift-in data window signal 1011 is obtained through a delay circuit 734 with the memory clock signal 1003 applied as a clock input thereto, in the form of a signal which resulted from delaying the bus clock signal 1003 by three machine cycles (delay time of 1 machine cycle + shift time of 1 machine cycle in terms of the bus clock signal 1004).

In FIG. 7D, the shift-in signal 1018 is obtained by delaying the shift-in data window signal 1011 by one basic clock time through a delay circuit 735 with the original clock signal 1001 applied as a clock input thereto, then ANDing that delayed signal, an inverted signal of the wait-2 signal 1008 and an input ready signal 1114 indicating that the buffer memory 707 is ready to input data, and then producing a pulse signal through a flip-flop circuit 755 with the original clock signal 1001 applied as a clock input thereto, the pulse signal having a value '1' only for one original clock time upon falling of the basic clock signal 1002 when the above ANDed signal takes a value '1'.

The shift-out data window signal 1012 is obtained as a signal which resulted from delaying the bus clock-1 signal 1005 by (M − 1) machine cycles through a delay circuit 736 with the memory clock signal 1003 applied as a clock input thereto, and then further delaying that delayed signal by one basic clock time through a delay circuit 737 with the basic clock signal 1002 applied as a clock input thereto.

Also in FIG. 7D, the shift-out signal 1019 is obtained by delaying the shift-out data window signal 1012 by one basic clock time through a delay circuit 738 with the original clock signal 1001 applied as a clock input thereto, then ANDing that delayed signal, an inverted signal of the wait-2 signal 1008 and the output ready signal 1115, and then producing a pulse signal through a flip-flop circuit 756 with the original clock signal 1001 applied as a clock input thereto, the pulse signal having a value '1' only for one original clock time upon falling of the basic clock signal 1002 when the above ANDed signal takes a value '1'.

What is claimed is:

1. A pipe-lined data processor system of synchronous type comprising:
   a plurality of memory devices for storing data;
   a plurality of processors, interconnected in the form of a pipeline and connected in common to each of said memory devices through an output data bus, for reading out stored data from said memory devices in predetermined sequence, executing data processing one after another on the read data, and writing results of said data processing into said memory devices in a predetermined sequence via an input data bus; and
   a controller connected in common to said memory devices through said input data bus and to said processors for managing the operation sequences of said processors and said memory devices;
   wherein said plurality of memory devices each include (1) a main memory for storing data to be processed or data having been processed by said processors, (2) a buffer memory disposed between said main memory and said input data buses and output data buses for temporarily storing data, for outputting a first storage status signal indicating that data is stored in the buffer memory in a nearly-full state in an amount more than a predetermined amount, for outputting a second storage status signal indicating that the data is stored in the buffer memory in a nearly-empty state in an amount less than a predetermined amount, for outputting a third storage status signal indicating that said buffer memory is ready to input data, and for outputting a fourth storage status signal indicating that said buffer memory is ready to output data, (3) first control means for controlling the timing of input and output of data between said main memory and said buffer memory in accordance with said first through fourth storage status signals, and (4) second control means for controlling the timing of input and output of data between said buffer memory and said input data bus and output data bus in accordance with said first through fourth storage status signals, a first general storage status signal indicating that all memory devices in a first group of said plurality of memory devices are ready to input data, and a second general storage status signal indicating that all memory devices in a second group of said plurality of memory devices are ready to output data;
   said controller including means responsive to said first and second general storage status signals for controlling the timing at which data input into said processors is read out of each memory device and the timing at which data output from said processors is written into each memory device.

2. A pipe-lined data processor system according to claim 1, wherein said plurality of memory devices are divided into said first group comprising input memory devices for reading data and said second group comprising output memory devices for writing data.

3. A pipe-lined data processor system according to claim 2, wherein each of said input memory devices is connected in wired OR fashion to produce said first general storage status signal and each of said output memory devices is connected in wired OR fashion to produce said second general storage status signal.

4. A pipe-lined data processor system according to claim 1, wherein said second control means of each said memory device comprises a combination logic circuit.

5. A pipe-lined data processor system according to claim 1, wherein said first control means of each said memory devices comprises a sequential controller for determining whether data is read out of said main memory to said buffer memory or data is written from said buffer memory into said main memory, based on said first through fourth storage status signals, and address generator responsive to said sequential controller for generating addresses to access said main memory.

6. A pipe-lined data processor system according to claim 1, wherein said controller operates to stop an operation clock signal applied to each said processor if either one of said first and second general storage status signals i turn off.

7. A pipe-lined data processor system according to claim 1, wherein when outputting a processed result after execution of a predetermined data processing, each said processor outputs a signal obtained by delaying a timing signal input from a preceding processor by a period corresponding to the processing time.

8. A pipe-lined data processor system according to claim 1, wherein at least one of said memory devices, said controller board, and said processors comprise means for selectively adding a flag indicating whether data is valid or invalid in accordance with a flag signal for data stored in said memory device.

9. A pipe-lined data processor system according to claim 1, wherein said main memory of each said memory devices consists of dynamic memory device, and said first control means operates to control a refresh operation of said dynamic memory device cyclically.

10. A pipe-lined data processor system of synchronous type comprising:
   a plurality of memory devices for storing data;
   a plurality of processors, interconnected in the form of a pipeline and connected in common to each of said memory devices through an output data bus, for reading out stored data from said memory devices in predetermined sequence, executing data processing one after another on the read data, and writing results of said data processing into said memory devices in a predetermined sequence via an input data bus; and
   a controller connected to said memory devices through input data buses and to said processors for managing the operation sequences of said processors and said memory devices;
   wherein said plurality of memory devices each include (1) a main memory chip module in the form of a dynamic memory for storing data to be processed or data having been processed by said processors, (2) a FIFO-type buffer memory disposed between said main memory chip module and said input data bus and output data bus for temporarily storing data, and having means for outputting a first storage status signal indicating that data is stored in the buffer memory in a nearly-full state in an amount more than $1-(1/N)$ times the total capacity of the buffer memory and means for outputting a second storage status signal indicating that the data is stored in the buffer memory in a nearly-empty state in an amount less than $1/N$ time the total capacity of the buffer memory, and (3) sequential control means responsive to said first and second storage status signals and a refresh request signal to control read/write operations of said main memory chip module in accordance with a predetermined sequence, irrespective of refresh processing of said main memory chip module and differences in input/output operation speeds.

11. A pipe-lined data processor system according to claim 10, wherein, assuming that the total capacity of said buffer memory if L and the read/write unit of data with respect to said main memory chip module is P (positive integer), said FIFO type buffer memory sets N as 2 or a larger positive number which meets the relationship of $(L/N) > P$.

12. A pipe-lined data processor system according to claim 10, wherein, with one cycle time of a basic clock signal being Tb and one cycle time of a clock signal of the external system being Tp, said main memory chip module executes read/writing of P data in parallel during one machine cycle period (Tb·P), and said main memory chip module performs reading/writing of effective data during R machine cycles among M machine cycles at a maximum (where $R < M$, R and M are positive integers), performs a refresh operation during one machine cycle per $K \times M$ machine cycles (where K is a positive integer) in a time sharing manner with respect to said reading/writing of effective data, and performs said operations cyclically to enable proper reading/writing of data for any external system which has a cycle Tp satisfying the relationship $(1/Tb) \cdot (R/M) > (1l/Tp)$.

13. A pipe-lined data processor system according to claim 10, wherein said buffer memory has the total data capacity larger than a minimum value determined by Max[P·R·N/(N−1), P·N], so that proper reading/reading of data can be performed for any external system which has a cycle time Tp satisfying the relationship $(1l/Tb) \cdot (R/M) > (1/Tp)$.

14. A pipe-lined data processor system according to claim 10, wherein said sequential control means operates by the use of a window signal, while reading, to prevent writing of invalid data read out during a refresh operation into said buffer memory, and to prevent writing of data read out of said main memory chip module into said buffer memory when said buffer memory is in a nearly-full state, and while writing, operates to prevent reading of any data from said buffer memory during a refresh operation, and to prevent reading of any data from said buffer memory when said buffer memory is in a nearly-empty state, whereby data can be read/written with respect to said main memory chip module and said buffer memory, irrespective of the status of said buffer memory and the presence or absence of a refresh operation.

15. A pipe-lined data processor system according to claim 10, wherein said sequential control means detects that the number of data input to said buffer memory is not less than P (positive integer), during reading/writing with respect to said input/output data buses, and then starts reading from said buffer memory to the external system, during reading of data from said main memory chip module, and similarly detects the number of data and then starts reading from said buffer memory to said main memory chip module, during writing of data into said main memory chip module.

16. A pipe-lined data processor system according to claim 10, wherein said sequential control means starts reading from a time point at which said buffer memory is neither in a nearly-empty state nor in a nearly-full state, during reading of data to said processors, and starts reading from said buffer memory to said main memory chip module from a time point at which said buffer memory is neither in a nearly-empty state nor in a nearly-full state, during writing of data from said processors, thereby preventing said buffer memory from being brought into a full state temporarily at the time of operation start.

* * * * *